(12) United States Patent
Wang et al.

(10) Patent No.: US 12,200,746 B2
(45) Date of Patent: Jan. 14, 2025

(54) ACTIVE INTERFERENCE CANCELLATION FOR SIDELINK COMMUNICATIONS

(71) Applicant: QUALCOMM Incorporated, San Diego, CA (US)

(72) Inventors: Xiaojie Wang, Hillsborough, NJ (US); Xiaoxia Zhang, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 426 days.

(21) Appl. No.: 17/645,298

(22) Filed: Dec. 20, 2021

(65) Prior Publication Data
US 2023/0199818 A1    Jun. 22, 2023

(51) Int. Cl.
*H04W 72/541* (2023.01)
*H04W 72/20* (2023.01)

(52) U.S. Cl.
CPC ......... *H04W 72/541* (2023.01); *H04W 72/20* (2023.01)

(58) Field of Classification Search
CPC .. H04W 72/541; H04W 72/20; H04L 5/0048; H04L 5/0051; H04L 27/26265; H04L 5/0066; H04J 11/0023
See application file for complete search history.

(56) References Cited

U.S. PATENT DOCUMENTS

| 2010/0054115 A1* | 3/2010 | Roh ................. H04L 27/26265 370/208 |
| 2010/0165956 A1* | 7/2010 | Razzell ................ H04L 5/0058 455/63.1 |
| 2013/0058432 A1* | 3/2013 | Futatsugi ............ H04L 27/2646 375/296 |
| 2016/0337992 A1* | 11/2016 | Sheu .................... H04W 56/001 |
| 2017/0195143 A1* | 7/2017 | Chen ................. H04L 25/03006 |
| 2020/0383130 A1* | 12/2020 | Bar-Or Tillinger ... H04L 5/0094 |
| 2021/0067290 A1* | 3/2021 | Chen ..................... H04L 5/0033 |

FOREIGN PATENT DOCUMENTS

JP    6598146 B2 * 10/2019

OTHER PUBLICATIONS

Datta et al. "Improved ACLR by Cancellation Carrier Insertion in GFDM Based Cognitive Radios", IEEE Xplore, 2014 (Year: 2014).*
Brandes et al. "Sidelobe Suppression in OFDM Systems by Insertion of Cancellation Carriers", IEEE Xplore, 2005 (Year: 2005).*
Alian et al. "Improved Active Interference Cancellation for Sidelobe Suppression in Cognitive OFDM Systems", IEEE Xplore, 2012 (Year: 2012).*
International Search Report and Written Opinion—PCT/US2022/081720—ISA/EPO—Mar. 27, 2023.

* cited by examiner

*Primary Examiner* — Ayaz R Sheikh
*Assistant Examiner* — Mang Boi Thawng
(74) *Attorney, Agent, or Firm* — Polsinelli LLP

(57) ABSTRACT

Disclosed are systems and techniques for wireless communications. In one example, a method for wireless communications performed at a first user equipment (UE) can include determining at least one active interference cancellation (AIC) area for protection during a sidelink communication. In some aspects, the method can include determining one or more frequency subcarriers associated with protection of the at least one AIC area during the sidelink communication, wherein transmission of the one or more frequency subcarriers is configured to reduce interference within the at least one AIC area.

30 Claims, 10 Drawing Sheets

ACTIVE INTERFERENCE CANCELLATION FOR SIDELINK COMMUNICATIONS

FIELD OF THE DISCLOSURE

The present disclosure generally relates to wireless communications. For example, aspects of the present disclosure relate to systems and techniques for implementing active interference cancellation (AIC) for sidelink communications.

BACKGROUND OF THE DISCLOSURE

Wireless communications systems are deployed to provide various telecommunications and data services, including telephony, video, data, messaging, and broadcasts. Broadband wireless communications systems have developed through various generations, including a first-generation analog wireless phone service (1G), a second-generation (2G) digital wireless phone service (including interim 2.5G networks), a third-generation (3G) high speed data, Internet-capable wireless device, and a fourth-generation (4G) service (e.g., Long-Term Evolution (LTE), WiMax). Examples of wireless communications systems include code division multiple access (CDMA) systems, time division multiple access (TDMA) systems, frequency division multiple access (FDMA) systems, orthogonal frequency division multiple access (OFDMA) systems, Global System for Mobile communication (GSM) systems, etc. Other wireless communications technologies include 802.11 Wi-Fi, Bluetooth, among others.

A fifth-generation (5G) mobile standard calls for higher data transfer speeds, greater number of connections, and better coverage, among other improvements. The 5G standard (also referred to as "New Radio" or "NR"), according to Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

Aspects of LTE, 5G, and/or other communications protocols may support direct communications between devices, which may be referred to as sidelink communications. As used herein, sidelink or sidelink communications generally refers to any direct device-to-device communication protocol. For example, the term sidelink may refer to 3GPP sidelink (e.g., using a PC5 sidelink interface). Sidelink may also refer to a Wi-Fi protocol for direct device-to-device communications, referred to as Dedicated Short Range Communication (DSRC) protocol. As the demand for mobile broadband access and general communications continues to increase, further improvements in 5G, LTE, and other radio access technologies, as well as other communications technologies (e.g., WiFi, etc.), remain useful.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Disclosed are systems, methods, apparatuses, and computer-readable media for performing wireless communications. In one illustrative example, a method for wireless communications performed at a user equipment (UE) is provided. The method includes: determining at least one active interference cancellation (AIC) area for protection during a sidelink communication; and determining one or more frequency subcarriers associated with protection of the at least one AIC area during the sidelink communication, wherein transmission of the one or more frequency subcarriers is configured to reduce interference within the at least one AIC area.

In another example, an apparatus for wireless communication is provided that includes at least one memory comprising instructions and at least one processor (e.g., implemented in circuitry) configured to execute the instructions and cause the apparatus to: determine at least one active interference cancellation (AIC) area for protection during a sidelink communication; and determine one or more frequency subcarriers associated with protection of the at least one AIC area during the sidelink communication, wherein transmission of the one or more frequency subcarriers is configured to reduce interference within the at least one AIC area.

In another example, a non-transitory computer-readable medium is provided for performing wireless communications, which has stored thereon instructions that, when executed by one or more processors, cause the one or more processors to: determine at least one active interference cancellation (AIC) area for protection during a sidelink communication; and determine one or more frequency subcarriers associated with protection of the at least one AIC area during the sidelink communication, wherein transmission of the one or more frequency subcarriers is configured to reduce interference within the at least one AIC area.

In another example, an apparatus for wireless communications is provided. The apparatus includes: means for determining at least one active interference cancellation (AIC) area for protection during a sidelink communication; and means for determining one or more frequency subcarriers associated with protection of the at least one AIC area during the sidelink communication, wherein transmission of the one or more frequency subcarriers is configured to reduce interference within the at least one AIC area.

In another illustrative example, a method of wireless communications performed at a first user equipment (UE) is provided. The method includes: determining at least one active interference cancellation (AIC) area for protection during a sidelink communication by a second UE; and outputting for transmission to the second UE a request for protecting the AIC area.

In another example, an apparatus for wireless communication is provided that includes at least one memory comprising instructions and at least one processor (e.g., implemented in circuitry) configured to execute the instructions and cause the apparatus to: determine at least one active interference cancellation (AIC) area for protection during a sidelink communication by a user equipment (UE); and output for transmission to the UE a request for protecting the AIC area.

In another example, a non-transitory computer-readable medium is provided for performing wireless communications, which has stored thereon instructions that, when executed by one or more processors, cause the one or more processors to: determine at least one active interference cancellation (AIC) area for protection during a sidelink communication by a user equipment (UE); and output for transmission to the UE a request for protecting the AIC area.

In another example, an apparatus for wireless communications is provided. The apparatus includes: means for determining at least one active interference cancellation (AIC) area for protection during a sidelink communication by a user equipment (UE); and means for outputting for transmission to the UE a request for protecting the AIC area.

In some aspects, the apparatus is or is part of a mobile device (e.g., a mobile telephone or so-called "smart phone", a tablet computer, or other type of mobile device), a wearable device, an extended reality device (e.g., a virtual reality (VR) device, an augmented reality (AR) device, or a mixed reality (MR) device), a personal computer, a laptop computer, a video server, a television, a vehicle (or a computing device of a vehicle), or other device having a radio frequency (RF) interface. In some aspects, the apparatus is or is part of a base station (e.g., a 3GPP gNodeB (gNB) for 5G/NR, a 3GPP eNodeB (eNB) for LTE, a Wi-Fi access point (AP), or other base station). In some aspects, the apparatus includes a transceiver configured to transmit and/or receive radio frequency (RF) signals. In some aspects, the processor includes a neural processing unit (NPU), a central processing unit (CPU), a graphics processing unit (GPU), or other processing device or component.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided for illustration of the aspects and not limitation thereof.

DETAILED DESCRIPTION

Figure 1:
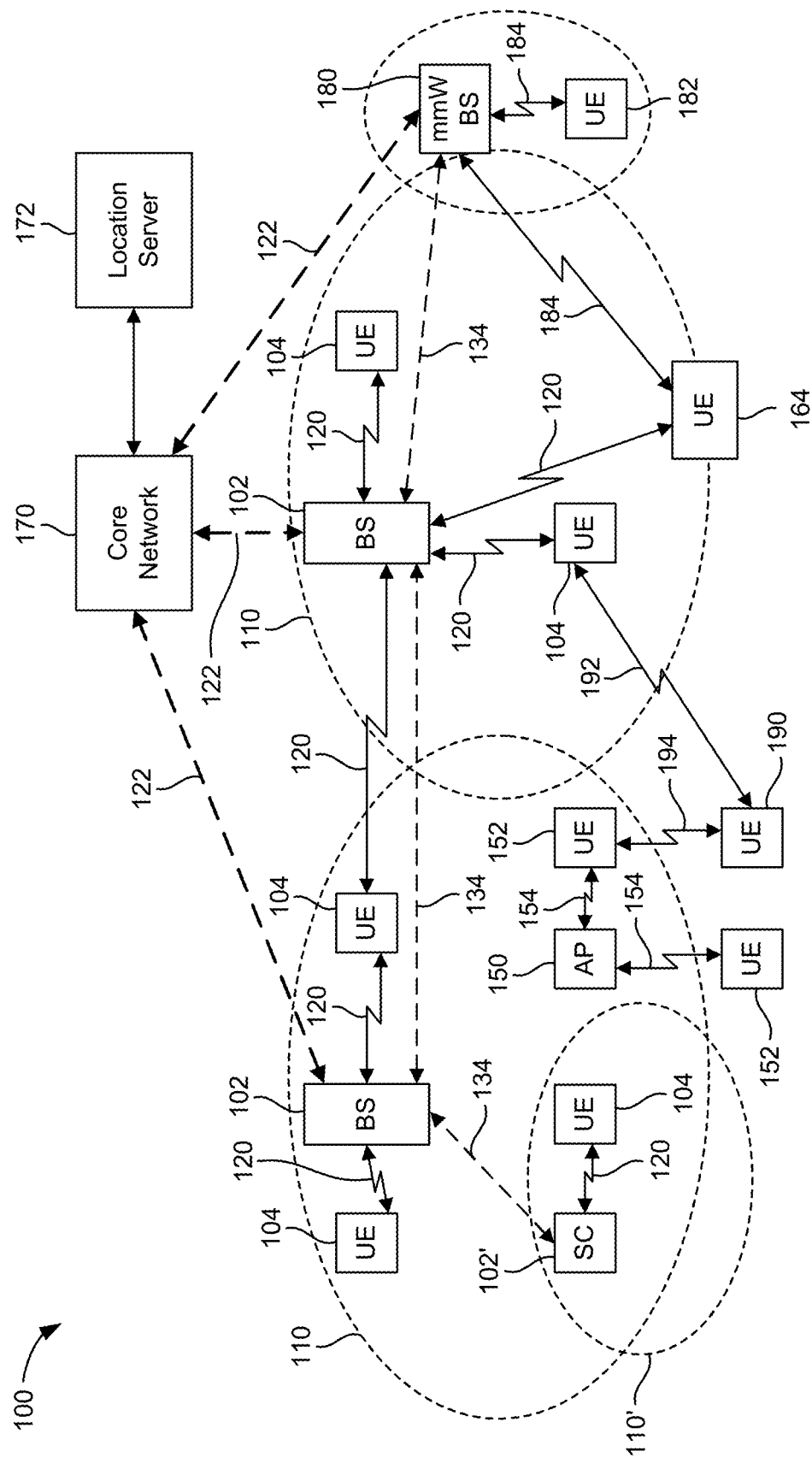
FIG. 1 is a block diagram illustrating an example of a wireless communication network, in accordance with some examples.

Certain aspects and embodiments of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects and embodiments described herein may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the scope of the application as set forth in the appended claims.

Wireless communication networks are deployed to provide various communication services, such as voice, video, packet data, messaging, broadcast, and the like. A wireless communication network may support both access links and sidelinks for communication between wireless devices. An access link may refer to any communication link between a client device (e.g., a user equipment (UE), a station (STA), or other client device) and a base station (e.g., a 3GPP gNodeB (gNB) for 5G/NR, a 3GPP eNodeB (eNB) for LTE, a Wi-Fi access point (AP), or other base station). In one example, an access link between a UE and a 3GPP gNB can be over a Uu interface. In some cases, an access link may support uplink signaling, downlink signaling, connection procedures, etc.

A sidelink may refer to any communication link between client devices (e.g., UEs, STAs, etc.). For example, a sidelink may support device-to-device (D2D) communications, vehicle-to-everything (V2X) and/or vehicle-to-vehicle (V2V) communications, message relaying, discovery signaling, beacon signaling, or any combination of these or other signals transmitted over-the-air from one UE to one or more other UEs. In some examples, sidelink communications may be transmitted using a licensed frequency spectrum or an unlicensed frequency spectrum (e.g., 5 gigahertz (GHz) or 6 GHz). As used herein, the term sidelink can refer to 3GPP sidelink (e.g., using a PC5 sidelink interface), Wi-Fi direct communications (e.g., according to a Dedicated Short Range Communication (DSRC) protocol), or using any other direct device-to-device communication protocol.

In some examples, sidelink communications can be performed in a first mode (e.g., mode 1) in which a base station allocates the resources (e.g., time and/or frequency resources such as frame, sub-frame, sub-carrier, resource block, resource element, etc.) that are used for the sidelink transmissions. In some cases, sidelink communications can be performed in a second mode (e.g., mode 2) in which a UE can autonomously select the resources that are used for the sidelink transmissions.

Sidelink communications can be performed using one or more modulation schemes. For example, sidelink communications can be performed using orthogonal frequency division multiplexing (OFDM), cyclic prefix OFDM (CP-OFDM), discrete Fourier transform spread OFDM (DFT-s-OFDM), frequency division multiplexing (FDM), time division multiple access (TDMA), and/or any other suitable modulation scheme.

In some cases, a sidelink transmission (e.g., transmitted OFDM signal) can cause out-of-band radiation (e.g., sidelobes) that may interfere with neighboring wireless communications. In some examples, interference due to out-of-band radiation may inhibit reception and/or decoding of sidelink communications. In some instances, UEs may use different synchronization sources (e.g., GNSS, base station, other UEs, internal clocks, etc.), such as to synchronize the UE to the transmitter of the signals (e.g., another UE transmitting sidelink communications to the UE). In some configurations, relative synchronization errors between sidelink UEs may aggravate the effects caused by interference (e.g., subcarriers may not be aligned in frequency domain). In some cases, UEs may be moving at relatively high velocities, which may also worsen the effects caused by interference.

Systems, apparatuses, processes (also referred to as methods), and computer-readable media (collectively referred to as "systems and techniques") are described herein for performing active interference cancellation (AIC) for sidelink communications. The systems and techniques provide the ability for a user equipment (UE) to reduce or eliminate out-of-band interference during sidelink communications using AIC. The systems and techniques also provide the ability for a UE or a base station to signal a request for AIC to protect frequency resources during sidelink communications.

In some aspects, a UE can be configured to identify an AIC optimization area (e.g., an AIC area for protection) for a sidelink communication. In some cases, a UE may identify an AIC optimization area based on a request (e.g., signaling) received from another UE. In some aspects, a UE may identify an AIC optimization area based on a request received from a base station. In some examples, a UE may identify an AIC optimization area based on a priority level associated with sidelink communications. In some aspects, a UE may implement AIC based on a channel busy ratio (CBR). In some cases, a UE may implement AIC based on a synchronization source.

In some examples, a UE may determine one or more AIC parameters for performing AIC during a sidelink communication. In some cases, the one or more parameters may include a number of frequency subcarriers, a position of frequency subcarriers, a power level of frequency subcarriers, any combination thereof, and/or other parameters. In some aspects, the AIC parameters may be determined based on the frequency range corresponding to the AIC optimization area. Additionally or alternatively, in some cases, the AIC parameters may be determined based on a leakage requirement associated with the AIC optimization area. Additionally or alternatively, in some examples, the AIC parameters may be determined based on an AIC configuration (e.g., parameters may be pre-configured on a UE).

In some cases, a UE may signal an indication of the AIC parameters to a receiving UE. In some examples, the indication can include a first level indication that AIC was performed in connection with the sidelink communication. In some aspects, the indication can include a second level indication that identifies AIC parameters (e.g., frequency subcarrier position, power level, etc.). In some instances, the indication may be transmitted using sidelink control information (SCI). In some examples, a receiving UE may disregard (e.g., not decode) signals received via the frequency subcarriers associated with AIC.

Various aspects of the systems and techniques will be discussed below with respect to the figures. According to various aspects, FIG. 1 illustrates an example of a wireless communications system 100. The wireless communications system 100 (which may also be referred to as a wireless wide area network (WWAN)) may include various base stations 102 and various user equipment devices (UEs) 104. As used herein, the term "UE" may be referred to interchangeably as an "access terminal" or "AT," a "user device," a "user terminal" or UT, a "client device," a "wireless device," a "subscriber device," a "subscriber terminal," a "subscriber station," a "mobile device," a "mobile terminal," a "mobile station," or variations thereof.

The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to a 4G/LTE network, or gNBs where the wireless communications system 100 corresponds to a 5G/NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 (e.g., access links) between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 can include devices (e.g., UEs etc.) that communicate with one or more UEs 104, base stations 102, APs 150, etc. utilizing the ultra-wideband (UWB) spectrum. The UWB spectrum can range from 3.1 to 10.5 GHz.

The small cell base station 102' may operate in a licensed and/or an unlicensed frequency spectrum (e.g., utilizing LTE or NR technology and use the same 5 GHz unlicensed frequency spectrum as used by the WLAN AP 150). The wireless communications system 100 may further include a millimeter wave (mmW) base station 180 that may operate in mmW frequencies and/or near mmW frequencies in communication with a UE 182. In some cases, mmW frequencies can be referred to as the FR2 band (e.g., including a frequency range of 24250 MHz to 52600 MHz). In some examples, the wireless communications system 100 can include one or more base stations (referred to herein as "hybrid base stations") that operate in both the mmW frequencies (and/or near mmW frequencies) and in sub-6 GHz frequencies (referred to as the FR1 band, e.g., including a frequency range of 450 to 6000 MHz). In some examples, the mmW base station 180, one or more hybrid base stations (not shown), and the UE 182 may utilize beamforming (transmit and/or receive) over a mmW communication link 184 to compensate for the extremely high path loss and short range. The wireless communications system 100 may further include a UE 164 that may communicate with a macro cell base station 102 over a communication link 120 and/or the mmW base station 180 over a mmW communication link 184.

In some examples, in order to operate on multiple carrier frequencies, a base station 102 and/or a UE 104 may be equipped with multiple receivers and/or transmitters. For example, a UE 104 may have two receivers, "Receiver 1" and "Receiver 2," where "Receiver 1" is a multi-band receiver that can be tuned to band (i.e., carrier frequency) 'X' or band 'Y,' and "Receiver 2" is a one-band receiver tuneable to band 'Z' only.

The wireless communications system 100 may further include one or more UEs, such as UE 190, that connect indirectly to one or more communication networks via one or more relay devices (e.g., UEs) by using device-to-device (D2D) peer-to-peer (P2P) links (referred to as "sidelinks"). In the example of FIG. 1, UE 190 has a D2D P2P link 192 with one of the UEs 104, which can be configured to operate as a relay device (e.g., through which UE 190 may indirectly communicate with base station 102). In another example, UE 190 also has a D2D P2P link 194 with WLAN STA 152, which is connected to the WLAN AP 150 and can be configured to operate as a relay device (e.g., UE 190 may indirectly communicate with AP 150). In an example, the D2D P2P links 192 and 194 may be supported with any well-known D2D RAT, such as LTE Direct (LTE-D), Wi-Fi Direct (Wi-Fi-D), Bluetooth®, UWB, and so on.

As noted above, UE 104 and UE 190 can be configured to communicate using sidelink communications. In some examples, UE 104 and UE 190 can operate using one or more different modes for sidelink communications. For example, in mode 1 the cellular network (e.g., base station 102) can select and manage the radio resources used by the UEs for performing sidelink communications. In another example, the UE 104 and UE 190 can be configured to operate using mode 2 in which the UEs can autonomously select the radio resources for sidelink communications. Mode 2 can operate without cellular coverage, and in some cases can be considered a baseline sidelink communications mode as devices and/or applications may not depend on the availability of cellular coverage. In some examples, mode 2 can include a distributed scheduling scheme for UEs to select radio resources.

Figure 2:
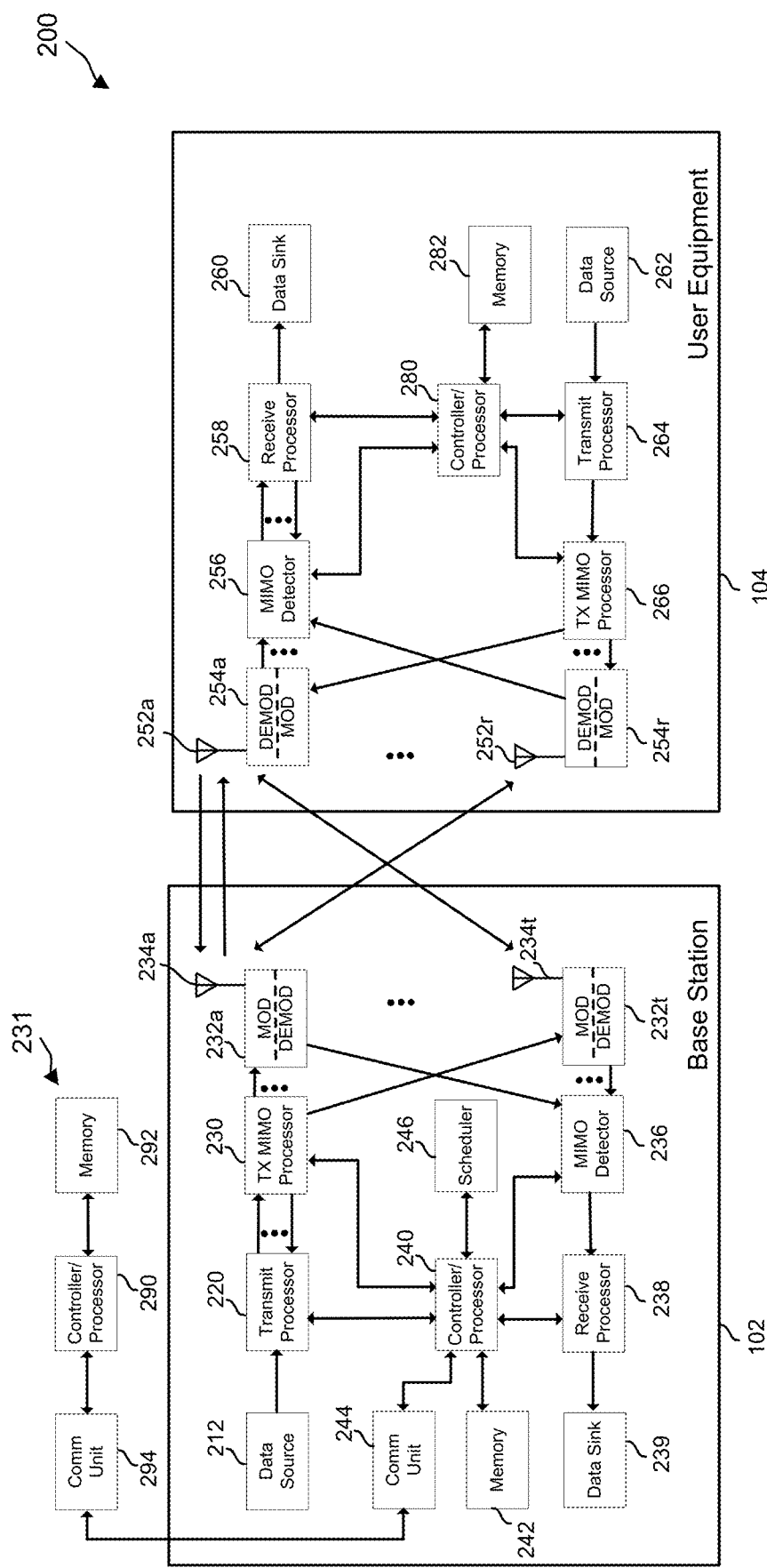
FIG. 2 is a diagram illustrating a design of a base station and a User Equipment (UE) device that enable transmission and processing of signals exchanged between the UE and the base station, in accordance with some examples.

FIG. 2 shows a block diagram of a design of a base station 102 and a UE 104 that enable transmission and processing of signals exchanged between the UE and the base station, in accordance with some aspects of the present disclosure. Design 200 includes components of a base station 102 and a UE 104, which may be one of the base stations 102 and one of the UEs 104 in FIG. 1. Base station 102 may be equipped with T antennas 234a through 234t, and UE 104 may be equipped with R antennas 252a through 252r, where in general T≥1 and R≥1.

At base station 102, a transmit processor 220 may receive data from a data source 212 for one or more UEs, select one or more modulation and coding schemes (MCS) for each UE based at least in part on channel quality indicators (CQIs) received from the UE, process (e.g., encode and modulate)

the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. The modulators 232a through 232t are shown as a combined modulator-demodulator (MOD-DEMOD). In some cases, the modulators and demodulators can be separate components. Each modulator of the modulators 232a to 232t may process a respective output symbol stream, e.g., for an orthogonal frequency-division multiplexing (OFDM) scheme and/or the like, to obtain an output sample stream. Each modulator of the modulators 232a to 232t may further process (e.g., convert to analog, amplify, filter, and upconvert) the output sample stream to obtain a downlink signal. T downlink signals may be transmitted from modulators 232a to 232t via T antennas 234a through 234t, respectively. According to certain aspects described in more detail below, the synchronization signals can be generated with location encoding to convey additional information.

At UE 104, antennas 252a through 252r may receive the downlink signals from base station 102 and/or other base stations and may provide received signals to demodulators (DEMODs) 254a through 254r, respectively. The demodulators 254a through 254r are shown as a combined modulator-demodulator (MOD-DEMOD). In some cases, the modulators and demodulators can be separate components. Each demodulator of the demodulators 254a through 254r may condition (e.g., filter, amplify, downconvert, and digitize) a received signal to obtain input samples. Each demodulator of the demodulators 254a through 254r may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 104 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 104, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals (e.g., based at least in part on a beta value or a set of beta values associated with the one or more reference signals). The symbols from transmit processor 264 may be precoded by a TX-MIMO processor 266 if application, further processed by modulators 254a through 254r (e.g., for DFT-s-OFDM, CP-OFDM, and/or the like), and transmitted to base station 102. At base station 102, the uplink signals from UE 104 and other UEs may be received by antennas 234a through 234t, processed by demodulators 232a through 232t, detected by a MIMO detector 236 if applicable, and further processed by a receive processor 238 to obtain decoded data and control information sent by UE 104. Receive processor 238 may provide the decoded data to a data sink 239 and the decoded control information to controller (processor) 240. Base station 102 may include communication unit 244 and communicate to a network controller 231 via communication unit 244. Network controller 231 may include communication unit 294, controller/processor 290, and memory 292.

In some aspects, one or more components of UE 104 may be included in a housing. Controller 240 of base station 102, controller/processor 280 of UE 104, and/or any other component(s) of FIG. 2 may perform one or more techniques associated with implicit UCI beta value determination for NR.

Memories 242 and 282 may store data and program codes for the base station 102 and the UE 104, respectively. A scheduler 246 may schedule UEs for data transmission on the downlink, uplink, and/or sidelink.

In some implementations, the UE 104 can include: means for determining at least one active interference cancellation (AIC) area for protection during a sidelink communication; and means for transmitting one or more frequency subcarriers associated with protection of the at least one AIC area during the sidelink communication, wherein transmission of the one or more frequency subcarriers reduces interference within the at least one AIC area. In some examples, the means for determining can include controller/processor 280, memory 282, receive processor 258, transmit processor 264, any combination thereof, or any other component(s) of the UE 104. In some examples, the means for transmitting can include controller/processor 280, transmit processor 264, TX MIMO processor 266, DEMODs 254a through 254r, antennas 252a through 252r, any combination thereof, or any other component(s) of the UE 104.

In some examples, the UE 104 can include: means for determining at least one active interference cancellation (AIC) area for protection during a sidelink communication by a user equipment (UE); and means for transmitting, to the UE, a request for protecting the AIC area. In some examples, the means for determining can include controller/processor 280, memory 282, receive processor 258, transmit processor 264, any combination thereof, or any other component(s) of the UE 104. In some examples, the means for transmitting can include controller/processor 280, transmit processor 264, TX MIMO processor 266, DEMODs 254a through 254r, antennas 252a through 252r, any combination thereof, or any other component(s) of the UE 104.

Figure 3:
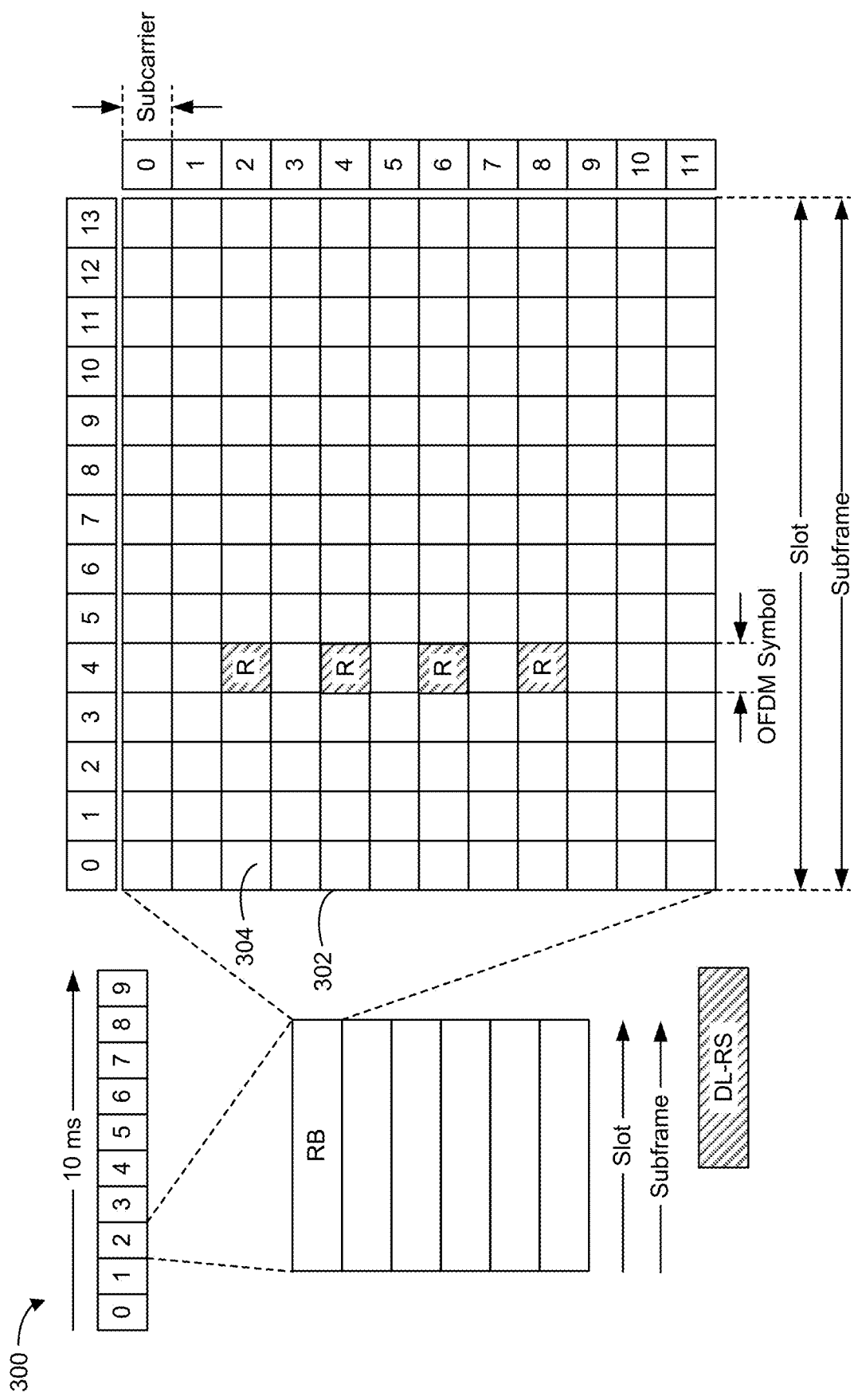
FIG. 3 is a diagram illustrating an example of a frame structure, in accordance with some examples.

Various radio frame structures may be used to support downlink, uplink, and sidelink transmissions between network nodes (e.g., base stations and UEs). FIG. 3 is a diagram 300 illustrating an example of a frame structure, according to some aspects of the disclosure. Other wireless communications technologies may have different frame structures and/or different channels.

NR (and LTE) utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal fast Fourier transform (FFT) size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast, NR may support multiple numerologies (p). For example, subcarrier spacing (SCS) of 15 kHz, 30 kHz, 60 kHz, 120 kHz, and 240 kHz or greater may be available. Table 1 provided below lists some various parameters for different NR numerologies.

TABLE 1

| | SCS (kHz) | Symbols/ Sot | Slots/ Subframe | Slots/ Frame | Slot Duration (ms) | Symbol Duration (µs) | Max. nominal system BW (MHz) with 4K FFT size |
|---|---|---|---|---|---|---|---|
| 0 | 15 | 14 | 1 | 10 | 1 | 66.7 | 50 |
| 1 | 30 | 14 | 2 | 20 | 0.5 | 33.3 | 100 |
| 2 | 60 | 14 | 4 | 40 | 0.25 | 16.7 | 100 |
| 3 | 120 | 14 | 8 | 80 | 0.125 | 8.33 | 400 |
| 4 | 240 | 14 | 16 | 160 | 0.0625 | 4.17 | 800 |

In one example, a numerology of 15 kHz is used. Thus, in the time domain, a 10 millisecond (ms) frame is divided into 10 equally sized subframes of 1 ms each, and each subframe includes one time slot. In FIG. 3, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. FIG. 3 illustrates an example of a resource block (RB) 302. The resource grid is further divided into multiple resource elements (REs). Referring to FIG. 3, the RB 302 includes multiple REs, including the resource element (RE) 304. The RE 304 may correspond to one symbol length in the time domain and one subcarrier in the frequency domain. In the numerology of FIG. 3, for a normal cyclic prefix, RB 302 may contain 12 consecutive subcarriers in the frequency domain and seven consecutive symbols in the time domain, for a total of 84 REs such as RE 304. For an extended cyclic prefix, an RB may contain 12 consecutive subcarriers in the frequency domain and six consecutive symbols in the time domain, for a total of 72 REs. The number of bits carried by each RE depends on the modulation scheme.

In some aspects, some REs can be used to transmit downlink reference (pilot) signals (DL-RS). The DL-RS can include Positioning Reference Signal (PRS), Tracking Reference Signal (TRS), Phase Tracking Reference Signal (PTRS), Channel State Information Reference Signal (CSI-RS), Demodulation Reference Signal (DMRS), Primary Synchronization Signal (PSS), Secondary Synchronization Signal (SSS), etc. The resource grid if FIG. 3 illustrates exemplary locations of REs used to transmit DL-RS (labeled "R").

In some aspects, one or more resources in the resource grid can be used to perform sidelink communications. For example, sidelink communications can be implemented using a mode (e.g., mode 1) in which a base station (e.g., base station 102) can designate/select one or more resources (e.g., subchannels, slots, resource elements (e.g., RE 304), resource blocks (e.g., RB 302), subcarriers, symbols, frames, sub-frames, etc.) for sidelink communications. In another example, sidelink communications can be implemented using a mode (e.g., mode 2) in which a UE (e.g., UE 104) can designate/select one or more resources (e.g., subchannels, slots, resource elements (e.g., RE 304), resource blocks (e.g., RB 302), subcarriers, symbols, frames, sub-frames, etc.) for sidelink communications. In some aspects, resource allocation for sidelink communications can correspond to one or more subchannels in the frequency domain and one or more slots in the time domain. In some cases, a subchannel may include from 10 RBs to 100 RBs. In some examples, a sidelink slot may include 7 to 14 OFDM symbols.

In some examples, a UE (e.g., UE 104) can be configured to receive a sidelink packet by performing blind decoding of all sidelink subchannels. In some aspects, the sidelink UE can decode (e.g., by performing blind decoding of) a Physical Sidelink Control Channel (PSCCH) in a configured sidelink resource pool. In some cases, the PSCCH can be used to carry sidelink control information (SCI) which contains information about the resource allocation on the Physical Sidelink Shared Channel (PSSCH). For example, a first stage SCI can be transmitted in PSCCH and may include information regarding the PSSCH bandwidth as well as resource reservations in future slots. In some cases, a second stage SCI can be located and decoded after decoding PSCCH. In some aspects, a source identifier and/or a destination identifier can be used to determine a source and/or destination UE associated with a packet. In some examples, the UE can proceed with decoding the PSSCH if the PSCCH (e.g, SCI) indicates or includes a receiver ID matching the ID of the UE. In some configurations, PSCCH and PSSCH can be transmitted using the same slot.

In some examples, PSCCH may be configured to occupy or use multiple RBs in a single subchannel. In some aspects, a subchannel can occupy multiple PRBs (e.g., a subchannel can occupy 10, 15, 20, 25, 50, 75, 100 PRBs). In some cases, PSCCH may be configured to occupy 10, 12, 15, 20, or 25 PRBs in a subchannel. In some aspects, PSCCH may be limited to one subchannel. In some cases, the duration of PSCCH can be configured use 2 or 3 symbols. In some aspects, a resource pool (RP) can include any number of subchannels (e.g., a RP can include 1-27 subchannels). In some cases, the size of PSCCH may be fixed for a RP (e.g., size can correspond to 10% to 100% of a subchannel). In some examples, PSSCH may occupy 1 or more subchannels and may include a second stage SCI.

Figure 4:
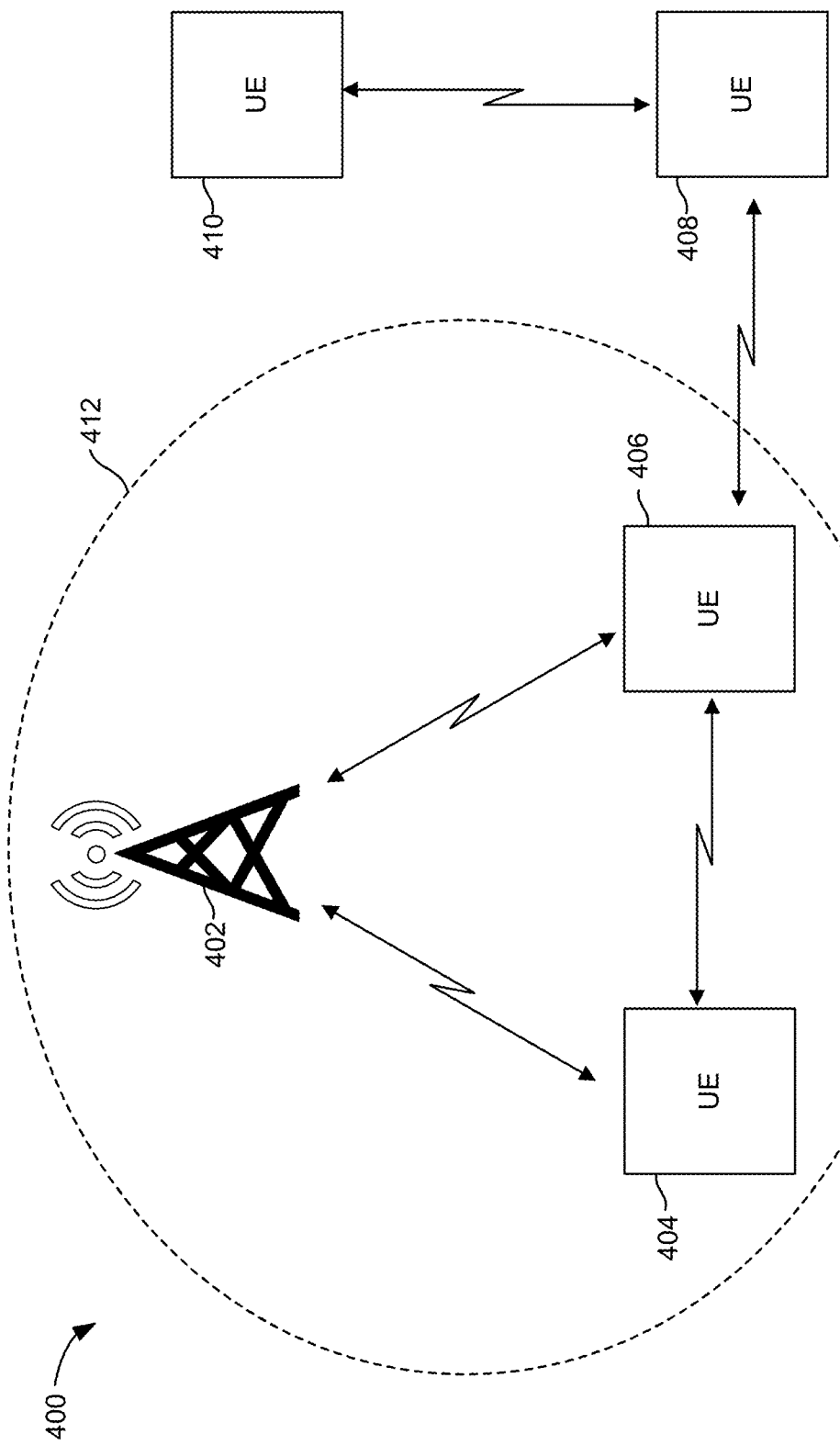
FIG. 4 is a block diagram illustrating another example of a wireless communication network, in accordance with some examples.

As noted above, systems and techniques are described herein for performing active interference cancellation (AIC) for sidelink communications. FIG. 4 is a diagram illustrating an example wireless communications system 400 for performing AIC for sidelink communications. While the system 400 is described using user equipment (UE) and base stations (BSs) as illustrative examples, the techniques described with respect to the system 400 can be performed by Wi-Fi stations (STA) and access points (APs) or by other devices that communicate using other communication protocols.

In some aspects, the system 400 may include a base station 402 that can be associated with coverage area 412. In some cases, base station 402 can include macro cell base stations and/or small cell base stations, as described in connection with system 100 (e.g., base stations 102). In other aspects, base station 402 can include a wireless access point, such as, for example, AP 150 described in connection with system 100.

In some examples, system 400 can include one or more user equipment (UE) devices, such as UE 404 and UE 406 that are within coverage area 412 of base station 402 as well as UE 408 and UE 410 that are outside of coverage area 412 of base station 402. As noted with respect to FIG. 1, a UE may include and/or be referred to as an access terminal, a user device, a user terminal, a client device, a wireless device, a subscriber device, a subscriber terminal, a subscriber station, a mobile device, a mobile terminal, a mobile station, or variations thereof. In some aspects, a UE can include a mobile telephone or so-called "smart phone", a tablet computer, a wearable device, an extended reality device (e.g., a virtual reality (VR) device, an augmented reality (AR) device, or a mixed reality (MR) device), a personal computer, a laptop computer, an internet of things (IoT) device, a television, a vehicle (or a computing device of a vehicle), or any other device having a radio frequency (RF) interface.

In some aspects, UE 404 and UE 406 can communicate with base station 402 in uplink (UL) and/or downlink (DL) directions. DL refers to the transmission direction from base station 402 to a UE, and UL refers to the transmission direction from a UE (e.g., UE 404, UE 406) to base station 402. In some examples, one or more of the UEs may utilize sidelink communications to communicate directly with each other. As illustrated, UE 404 and UE 406 may communicate directly via sidelink, UE 406 and UE 408 may directly communicate via sidelink, and UE 408 and UE 410 may communicate directly via sidelink.

In some cases, UE 404, UE 406, UE 408, and UE 410 may use one or more physical sidelink channels to perform sidelink communications. For example, the Physical Sidelink Control Channel (PSCCH) can be used to carry sidelink control information (SCI) which contains information about the resource allocation on the Physical Sidelink Shared Channel (PSSCH). In some examples, the PSSCH can be used to carry sidelink data as well as additional control information. In some cases, the Physical Sidelink Feedback Channel (PSFCH) can be used to provide feedback related to the successful or failed reception of a sidelink transmission. In some configurations, the Physical Sidelink Broadcast Channel (PSBCH) can be used to carry information for supporting synchronization in the sidelink.

In some examples, UE 404, UE 406, UE 408, and UE 410 can use one or more signals to facilitate sidelink communications. For example, a demodulation reference signal (DMRS) can be used by a receiver to decode an associated physical channel (e.g., DMRS for PSCCH; DMRS for PSSCH; DMRS for PSBCH). In some cases, a sidelink primary synchronization signal (S-PSS) and/or a sidelink secondary synchronization signal (S-SSS) can be used by a receiver to synchronize the receiver to the transmitter of the signals. In some aspects, a sidelink channel state information reference signal (SL CSI-RS) can be used for measuring channel state information (CSI) at the receiver that can then be provided to the transmitter as feedback that can be used for adjusting transmission parameters. In some aspects, a sidelink phase-tracking reference signal (SL PT-RS) can be used to mitigate effects of phase noise (e.g., due to oscillator limitations).

In some examples, UE 404 and UE 406 can be configured to perform sidelink communications using a mode (e.g., mode 1) in which base station 402 can assign and manage the sidelink radio resources. In some cases, base station 402 can allocate radio resources for sidelink communications based on dynamic grant (DG) scheduling, in which a UE requests resources for transmission of a transport block (TB). For instance, UE 404 and/or UE 406 can send a scheduling request to base station 402 (e.g., using Physical Uplink Control Channel (PUCCH)). The base station 402 can respond with an indication of the sidelink resources (e.g., slot(s), sub-channel(s), etc.) allocated for the sidelink transmission of the TB. In some cases, the base station 402 can provide the indication of the sidelink resources using the Downlink Control Information (DCI) transmitted over the Physical Downlink Control Channel (PDCCH).

In some cases, the base station 402 can allocate radio resources for sidelink communications based on configured grant (CG) scheduling. For instance, the UE 404 and/or the UE 406 can send a message to the base station 402 indicating information about the sidelink transmission (e.g., periodicity of TBs, TB maximum size, Quality of Service (QoS) information, etc.) and the base station 402 can allocate a CG that satisfies the UE requirements. In some examples, the CG allocation of sidelink resources (e.g., slot(s), sub-channels, etc.) can be provided to a UE using radio resource control (RRC) signaling.

In some examples, the UE 408 and the UE 410 can be configured to perform sidelink communications using a mode (e.g., mode 2) in which a UE can autonomously select sidelink radio resources. In some aspects, mode 2 of sidelink communications can be implemented outside of coverage area 412 (e.g., UE 408 and UE 410 are not associated with base station 402. In some examples, UE 408 and/or the UE 410 can select radio resources (e.g., frame(s), sub-carrier(s), etc.) for sidelink communications from a resource pool. In some cases, the resource pool for performing sidelink communications autonomously can be pre-configured by a base station (e.g., base station 402) when UE 408 and/or UE 410 are associated with the base station (e.g., within coverage area 412).

In some aspects, UE 404, UE 406, UE 408, and UE 410 may perform sidelink communications using one or more signal waveforms and/or modulation schemes. For example, UE 404, UE 406, UE 408, and UE 410 can perform sidelink communications using orthogonal frequency division multiplexing (OFDM), cyclic prefix OFDM (CP-OFDM), discrete Fourier transform spread OFDM (DFT-s-OFDM), frequency division multiplexing (FDM), time division multiple access (TDMA), and/or any other suitable waveform or modulation scheme.

In some cases, a sidelink transmission (e.g., transmitted OFDM signal) can cause out-of-band radiation that may interfere with neighboring wireless communications. For example, a sidelink transmission from UE 404 to UE 406 may include out-of-band radiation (e.g., interference) that can interfere with sidelink communications between UE 408 and UE 410. In another example, a sidelink transmission from UE 408 to UE 410 may include out-of-band radiation that can interfere with UL and/or DL communications between UE 404 and base station 402. In some aspects, a UE (e.g., UE 404, UE 406, UE 408, and/or UE 410) may implement active interference cancellation (AIC) techniques to eliminate or reduce interference caused by a sidelink transmission. In some cases, AIC can be performed by selecting one or more frequency subcarriers that can be used (e.g., for transmission of modulated symbols) as cancellation subcarriers for reducing out-of-band radiation.

Figure 5:
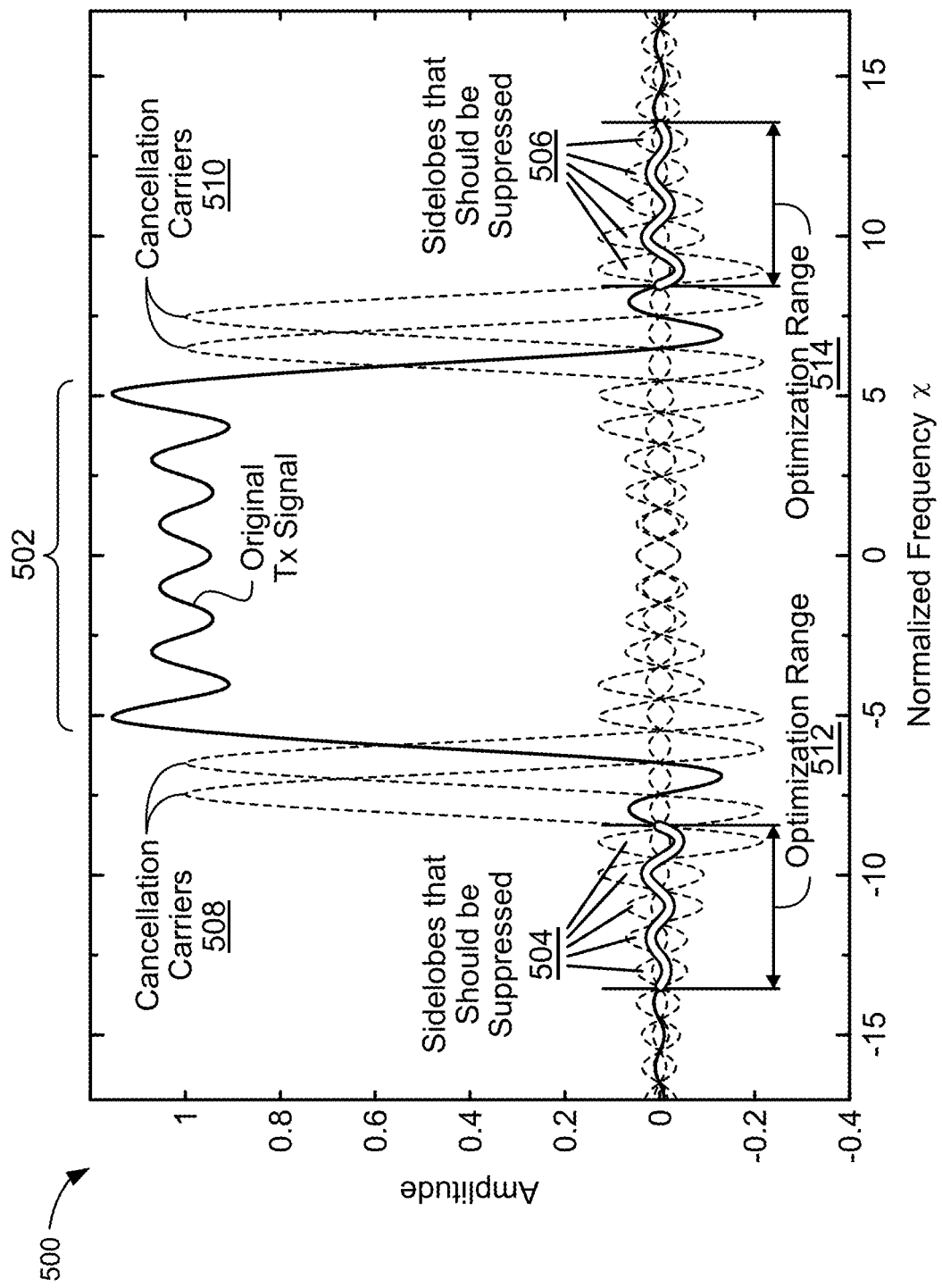
FIG. 5 is a waveform illustrating an example of active interference cancellation, in accordance with some examples.

FIG. 5 illustrates an example of a waveform 500 (e.g., an OFDM waveform) that may be used for sidelink communications. In some aspects, waveform 500 can include a transmitted portion that is within an allocated frequency range 502. In some cases, the waveform may also include out-of-band radiation such as sidelobes 504 and/or sidelobes 506 that are outside of the allocated frequency range 502. In some examples, sidelobes 504 and/or sidelobes 506 may cause interference with neighboring wireless communications. In some aspects, a UE (e.g., UE 404, UE 406, UE 408, and/or UE 410) can perform active interference cancellation (AIC) by simultaneously transmitting cancellation carriers 508 and/or cancellation carriers 510 (e.g., frequency subcarriers) to reduce, suppress, cancel, offset, decrease, and/or eliminate sidelobes 504 and/or sidelobes 506 inside of optimization range 512 and optimization range 514, respectively.

Returning to FIG. 4, in some aspects, one or more of the UEs (e.g., UE 404, UE 406, UE 408, and/or UE 410) can perform AIC for sidelink communications. For example, UE 406 can perform AIC to reduce interference associated with a sidelink transmission to UE 404. In some examples, a transmitting UE can identify one or more AIC areas for protection during a sidelink communication. In some cases, an AIC area for protection can correspond to one or more frequencies or frequency ranges for suppressing out-of-band radiation (e.g., sidelobes 504 and/or sidelobes 506) associated with a sidelink transmission.

In some examples, a UE (e.g., a transmitting UE) may identify an AIC area of protection during sidelink communications based on a request from a neighboring UE. For example, UE 406 can determine an AIC area of protection based on a request for AIC protection received from UE 408. In some aspects, the request for AIC protection from UE 408 may identify one or more frequencies and/or one or more frequency ranges for protection (e.g., optimization areas). In some examples, the request for AIC protection may identify a leakage requirement associated with a frequency or a frequency range.

In some cases, a UE may signal a request for AIC protection using sidelink control information (SCI). For example, UE 408 may signal a request for AIC protection to UE 406 using first stage SCI (e.g., SCI 1) via the Physical Sidelink Control Channel (PSCCH). In another example, UE 408 may signal a request for AIC protection to UE 406 using second stage SCI (e.g., SCI 2) via the Physical Sidelink Shared Channel (PSSCH).

In some aspects, the frequency range associated with a request for AIC protection during sidelink communications may correspond to a reserved retransmission resource (e.g., UE 408 may request that UE 406 perform AIC to protect a reserved retransmission resource associated with UE 408). In some examples, the frequency range associated with a request for AIC protection may correspond to periodically reserved resources (e.g., UE 408 may request that UE 406 perform AIC to protect periodically reserved resources associated with UE 408).

In some cases, a request for AIC protection during sidelink communications may be associated with a type of traffic. For instance, a request for AIC protection may be based on the priority level of the sidelink communication being above or below a threshold priority level value. In some examples, the priority level can correspond to a ProSe Per-Packet Priority (PPPP) for 4G LTE and/or 5G NR (e.g., defined in clause 5.4.6.1 of 3GPP technical specification (TS) 23.303). In some aspects, the priority level for a given data unit (e.g., protocol data unit or PDU) can be determined by a UE (e.g., UE 408). In one illustrative example, packet priority level may include 8 levels, with lower priority level values (e.g., priority levels of 1, 2, 3, etc.) being for higher-priority traffic than higher priority level values (e.g., priority levels of 4, 5, 6, and so on). In one illustrative example, UE 408 may request AIC protection (e.g., from UE 406) when the priority level associated with the sidelink communication (e.g., the associated frequency resource) is above a threshold of 3 for high-priority traffic (e.g., a priority level of 1, 2, or 3).

In some examples, a request for AIC protection may be made periodically. For instance, a UE may signal 'X' number of requests for a transmitting UE to implement AIC protection for a frequency resource within 'Y' number of slots. In one illustrative example, UE 408 may signal UE 406 to perform AIC protection two times every five slots. In another illustrative example, UE 408 may signal UE 406 to perform AIC protection one time per slot. In some aspects, the number of times that a UE may signal a request for AIC protection (e.g., per slot or some other time interval) may be set and/or limited based on a UE configuration, a number of UEs within range of sidelink communications, a base station configuration, a synchronization source, and/or any other factor.

In some aspects, a UE may identify an AIC area of protection for sidelink communications based on a threshold priority level associated with sidelink communication resources (in addition to or as an alternative to a signaling request from another UE and/or other parameters described herein). For instance, UE 406 may identify sidelink resource reservations that correspond to UE 404, UE 408, and/or UE 410 and that are associated with a threshold priority level. In some cases, UE 406 may identify resource reservations and their corresponding priority level based on sidelink control information (SCI). In some cases, different priority levels (e.g., priority level 1, 2, or 3) can be associated with different leakage requirements. For example, UE 406 may determine that a resource reservation having a priority level of 1 or 2 is associated with a low leakage requirement. In some aspects, a low leakage requirement can correspond to a value of −50 dBm or lower. In another example, UE 406 may determine that a resource reservation having a priority level of 3 or 4 is associated with an intermediate leakage requirement. In some examples, an intermediate leakage requirement may correspond to a value of −30 dBm. In some cases, the value of the leakage requirement may be higher or lower depending on the priority level. In some configurations, the value of the leakage requirement can correspond to a range of values associated with a priority level. In some cases, the range of values associated with one priority level may overlap with a range of values associated with another priority level. In some examples, the leakage requirement may be defined as an average power received within a bandwidth within the optimization range (e.g., within 1 MHz). In some aspects, the leakage requirement may correspond to a maximum peak power and/or maximum average power. As explained further below, in some aspects, the leakage requirement can be used to select one or more parameters associated with frequency subcarriers for implementing AIC.

In some examples, a UE may identify an AIC area of protection for sidelink communications based on a channel busy ratio (CBR) or channel busy time (CBT) (in addition to or as an alternative to a signaling request from another UE, the threshold priority level, and/or other parameters described herein). In some cases, CBR or CBT can be used to measure the channel load perceived by a UE (e.g., the ratio between the time a channel is sensed as busy and the total observation time). In some aspects, a higher CBR can indicate a higher number of neighboring UEs. In some examples, an increase in the CBR can result in higher level of interference. In some cases, a UE may implement AIC based on a threshold CBR value. For example, UE 406 may perform AIC for sidelink communications with UE 404 when the CBR is greater than or equal to 25%.

In some aspects, a UE may identify an AIC area of protection for sidelink communications based on signaling received from a base station (in addition to or as an alternative to a signaling request from another UE, the threshold priority level, the threshold CBR level, and/or other parameters described herein). For instance, UE 404 and/or UE 406 can receive signaling from base station 402 that can be used to configure AIC during sidelink communications. In some aspects, UE 404 and/or UE 406 can identify an AIC area of protection based on a resource pool configuration. For example, base station 402 may signal UE 404 and/or UE 406 to implement AIC to protect one or more frequency resources based on the resource pool configuration. In some examples, a UE may perform AIC based on a default AIC configuration. In some cases, the default AIC configuration can cause a UE to perform AIC for all frequencies (e.g., all subchannels) that are outside of the resource allocation associated with the UE (e.g., based on the resource pool). For example, UE 406 may be configured to perform AIC to protect frequencies that are outside of the resource allocation for UE 406.

In some examples, a UE may perform AIC during sidelink communications based on the sidelink synchronization signal (SLSS) source associated with the UE. In some cases, the source or reference for a UE to derive SLSS can include the global navigation satellite system (GNSS), a base station, another UE transmitting SLSS, or an internal clock. In some aspects, a UE that obtains a synchronization signal from another UE or from an internal clock may be configured to perform AIC during sidelink communications. In some examples, a UE that obtains a synchronization signal from GNSS or a base station may be configured to perform sidelink communications without AIC. For example, UE 404 and/or UE 406 may be configured to perform sidelink communications without AIC because of association with base station 402 (e.g., synchronization signal based on base station 402 or GNSS). In another example, UE 408 may be located in a tunnel with no GNSS signal and no base station coverage. In such a case, UE 408 may be configured to perform AIC during sidelink communications (e.g., synchronization signal based on another UE or an internal clock).

In some aspects, a UE can determine one or more parameters associated with performing AIC during sidelink communications. In some examples, the one or more parameters associated with AIC can include the number of frequency subcarriers (e.g., cancellation subcarriers) that are used to implement AIC, the position of the frequency subcarriers used to implement AIC, the power level of the frequency subcarriers used to implement AIC, the leakage requirement associated with the protected AIC area, the frequency range of the AIC area, and/or any other parameter that may be associated with AIC.

In some instances, the number of frequency subcarriers used to perform AIC during sidelink communications can be based on an AIC configuration. For example, UE 406 may have an AIC configuration that indicates the number of frequency subcarriers used for performing AIC (e.g., 2 frequency subcarriers). In some examples, the AIC configuration may indicate the number of frequency subcarriers for performing AIC based on a corresponding frequency resource (e.g., the AIC area for protection) and/or a leakage requirement. In some cases, a UE (e.g., UE 406) may select the number of frequency subcarriers for performing AIC based on options indicated in the AIC configuration (e.g., 1, 2, 4, etc.). In some aspects, a UE may select the number of frequency subcarriers based on sidelink control information (SCI), data received from a requesting UE, priority level of sidelink communications, base station signaling (e.g., resource pool configuration), resource allocation, channel busy ratio (CBR), and/or any other suitable factor.

In some aspects, a UE (e.g., UE 406) may determine a maximum number of frequency subcarriers that can be used to perform AIC during sidelink communications. In some cases, the maximum number of frequency subcarriers can be based on the number of resource allocations. In one illustrative example, the maximum number of frequency subcarriers used to perform AIC can be a percentage of the total number of resource elements (e.g., 1% of total number of REs).

In some examples, the position of frequency subcarriers used to perform AIC during sidelink communications can be based on an AIC configuration. For example, UE 406 may have an AIC configuration that indicates one or more pre-configured patterns for the frequency subcarriers. In some aspects, UE 406 may select the position and/or pattern of the frequency subcarriers based on the frequency allocation (e.g., frequency resources allocated to UE 406), the AIC area for protection, and/or the leakage requirement. In some cases, UE 406 may select one or more frequency subcarriers that are positioned at or near the boundary of the frequency allocation. In some examples, UE 406 may position the same number of frequency subcarriers on either side of the frequency allocation. In some aspects, UE 406 may position a different number of frequency subcarriers on either side of the frequency allocation. For example, UE 406 may position 2 frequency subcarriers on the upper boundary of the frequency allocation and 1 frequency subcarrier at the lower boundary of the frequency allocation.

In some cases, the position of the one or more frequency subcarriers can be selected to avoid interference with one or more reference signals and/or channels. For example, the position of the one or more frequency subcarriers can be selected to avoid the Physical Sidelink Control Channel (PSCCH) (e.g., includes SCI-1) as well as one or more reference signals (e.g., Positioning Reference Signal (PRS), Tracking Reference Signal (TRS), Phase Tracking Reference Signal (PTRS), Channel State Information Reference Signal (CSI-RS), Demodulation Reference Signal (DMRS), Primary Synchronization Signal (PSS), Secondary Synchronization Signal (SSS), etc.).

Figure 6A:
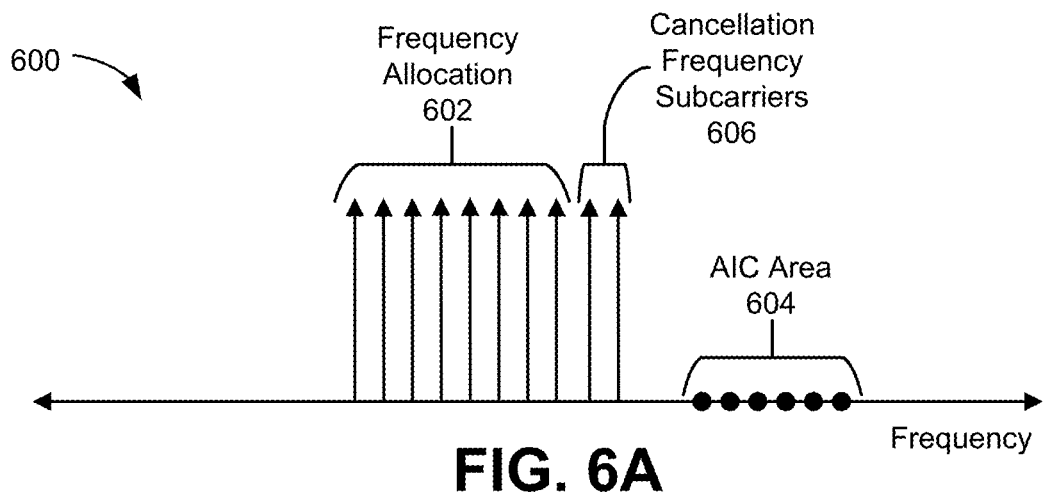
FIGS. 6A-6C are graphs illustrating examples of active interference cancellation patterns, in accordance with some examples.

FIG. 6A illustrates a graphical example of an AIC pattern 600 for sidelink communications that can be implemented by a UE (e.g., UE 404, UE 406, UE 408, and/or UE 410). As illustrated, AIC pattern 600 includes frequency allocation 602 which can correspond to the frequency resources used by a UE during a sidelink transmission. In some aspects, AIC pattern 600 may include AIC area 604 corresponding to a frequency range for protection (e.g., an AIC area for protection). In some cases, a UE may identify AIC area 604 based on a signaling request from another UE, a signaling request from a base station, a threshold priority level associated with a resource allocation, a threshold CBR level, an AIC configuration, and/or any other parameters described herein. As illustrated, AIC area 604 corresponds to a frequency range that is higher than frequency allocation 602.

In some aspects, AIC pattern 600 can include cancellation frequency subcarriers 606. In some examples, cancellation frequency subcarriers 606 can be transmitted at same time as frequency allocation 602 to eliminate or reduce interference within AIC area 604 (e.g., caused by transmission of signal within frequency allocation 602). In some cases, the position of cancellation frequency subcarriers 606 can be a higher frequency than frequency allocation 602.

Figure 6B:
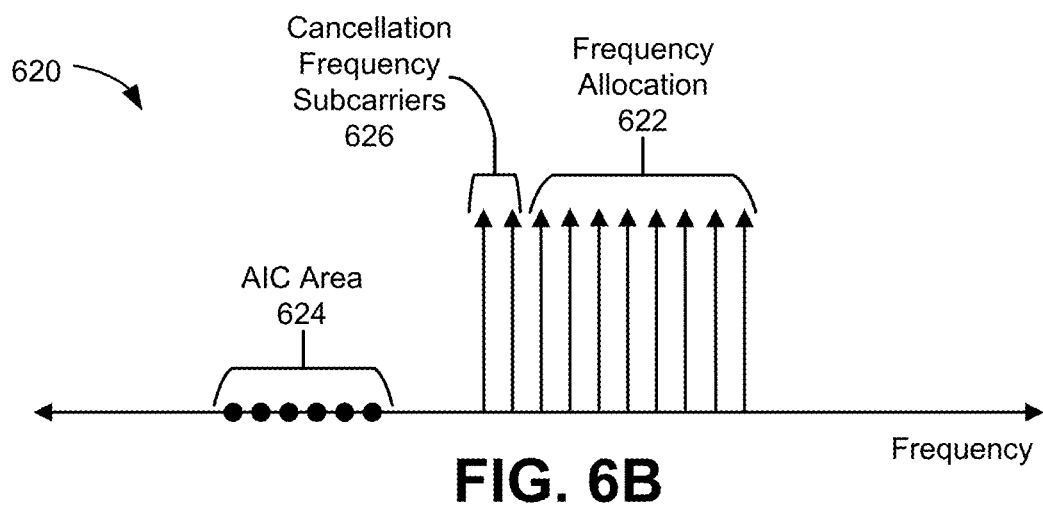

FIG. 6B illustrates a graphical example of an AIC pattern 620 for sidelink communications that can be implemented by a UE (e.g., UE 404, UE 406, UE 408, and/or UE 410). As illustrated, AIC pattern 620 includes frequency allocation 622 which can correspond to the frequency resources used by a UE during a sidelink transmission. In some aspects, AIC pattern 620 may include AIC area 624 corresponding to a frequency range for protection (e.g., an AIC area for protection). In some cases, a UE may identify AIC area 624 based on a signaling request from another UE, a signaling request from a base station, a threshold priority level associated with a resource allocation, a threshold CBR level, an AIC configuration, and/or any other parameters described herein. As illustrated, AIC area 624 corresponds to a frequency range that is lower than frequency allocation 622.

In some aspects, AIC pattern 620 can include cancellation frequency subcarriers 626. In some examples, cancellation frequency subcarriers 626 can be transmitted at same time as frequency allocation 622 to eliminate or reduce interference within AIC area 624 (e.g., caused by transmission of signal within frequency allocation 622). In some cases, the position of cancellation frequency subcarriers 626 can be a lower frequency than frequency allocation 622.

Figure 6C:
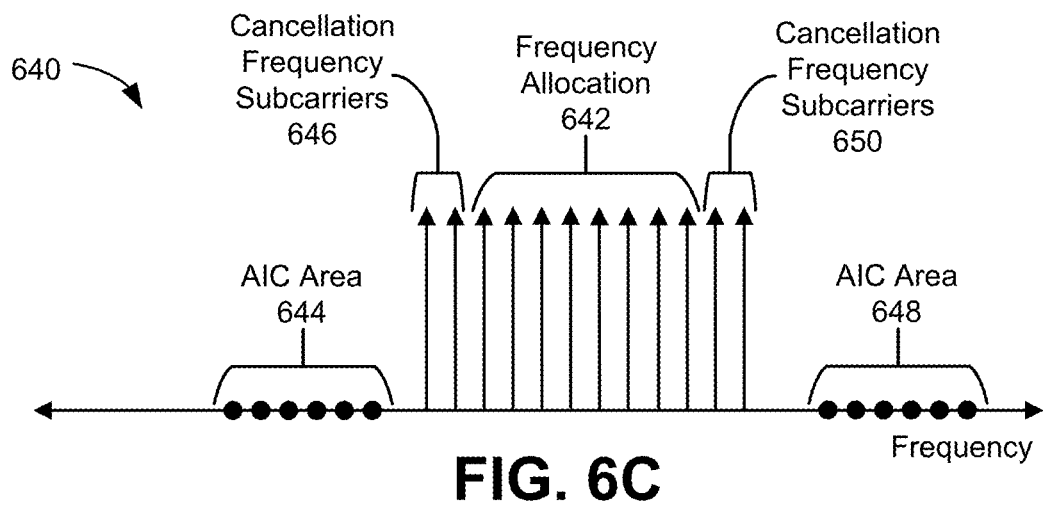

FIG. 6C illustrates a graphical example of an AIC pattern 640 for sidelink communications that can be implemented by a UE (e.g., UE 404, UE 406, UE 408, and/or UE 410). As illustrated, AIC pattern 640 includes frequency allocation 642 which can correspond to the frequency resources used by a UE during a sidelink transmission. In some aspects, AIC pattern 640 may include AIC area 644 and AIC area 648 corresponding to two different frequency ranges for protection (e.g., two different AIC areas for protection). In some cases, a UE may identify AIC area 644 and/or AIC area 648 based on a signaling request from another UE, a signaling request from a base station, a threshold priority level associated with a resource allocation, a threshold CBR level, an AIC configuration, and/or any other parameters described herein. As illustrated, AIC area 648 corresponds to a frequency range that is higher than frequency allocation 642 and AIC area 644 corresponds to a frequency range that is lower than frequency allocation 642.

In some aspects, AIC pattern 640 can include cancellation frequency subcarriers 646 and cancellation frequency subcarriers 650. In some examples, cancellation frequency subcarriers 646 and cancellation frequency subcarriers 650 can be transmitted at same time as frequency allocation 642 to eliminate or reduce interference within AIC area 644 and AIC area 648 (e.g., caused by transmission of signal within frequency allocation 602). In some cases, the position of cancellation frequency subcarriers 650 can be a higher frequency than frequency allocation 642. In some examples, the position of cancellation frequency subcarriers 650 can be selected to reduce interference within AIC area 648. In some cases, the position of cancellation frequency subcarriers 646 can be a lower frequency than frequency allocation 642. In some examples, the position of cancellation frequency subcarriers 646 can be selected to reduce interference within AIC area 644.

Returning to FIG. 4, in some aspects, the power level of AIC frequency subcarriers used to perform AIC during sidelink communications can be based on an AIC configuration. For example, a UE (e.g., UE 404, UE 406, UE 408, and/or UE 410) may have an AIC configuration that indicates the power level for transmitting one or more frequency subcarriers (e.g., cancellation frequency subcarriers 650). In some cases, the power level of the cancellation frequency subcarriers may be the same or similar to the power level of other tones (e.g., tones transmitted in frequency allocation 642 may have same power level as tones transmitted in cancellation frequency subcarriers 650). In some aspects, the total power for all AIC frequency subcarriers may be less than a threshold power level. In some aspects, the threshold power level for all AIC frequency subcarriers may correspond to a value of 0 dBm, 3 dBm, 5 dBm, or any other suitable power level for performing AIC. In some examples, the total power for all AIC frequency subcarriers can be based on the total power of the sidelink transmission. For instance, the total power for all AIC subcarriers may be configured as apercentage (e.g., 0.1%, 1%, or 10%) of the total power of the sidelink transmission. In some cases, the threshold power level for AIC frequency subcarriers may vary or depend on channel busy ratio (CBR), traffic priority level, and/or any other factor.

In some examples, a UE that performs AIC during sidelink communications may signal an indication of the AIC parameters to one or more receiving UEs. In some cases, the indication may identify one or more of the cancellation frequency subcarriers used for AIC. In some examples, a receiving UE may disregard signals received using the cancellation frequency subcarriers (e.g., cancellation frequency subcarriers are not decoded).

In some aspects, the indication of the AIC parameters may be signaled to a receiving UE using a two-stage SCI indication. In some cases, a first stage indication may include one or more bits in SCI 1 that can be used to indicate an on/off state for AIC (e.g., indicates whether sidelink transmission includes AIC). In some examples, a second stage indication may include AIC parameters (e.g., cancellation frequency subcarriers, power level, etc.) in SCI-2. For example, UE 404 may receive an indication (e.g., via SCI 1) that a sidelink transmission from UE 406 includes AIC. In some cases, UE 404 may determine the frequency subcarriers used for performing AIC based on a second stage indication (e.g., SCI 2).

In some examples, the indication of the AIC parameters may be signaled to a receiving UE using SCI 2 (e.g., received via PSSCH). In some aspects, SCI 2 may include one or more bits that can be used to indicate an on/off state for AIC (e.g., indicates whether sidelink transmission includes AIC). In some examples, SCI 2 may also include one or more AIC parameters (e.g., cancellation frequency subcarriers, power level, etc.).

In some cases, the indication of the AIC parameters may be signaled using a new SCI 2 format. In some examples, SCI 1 may be used to signal a receiving UE that a new SCI 2 format is present. In some aspects, presence of new SCI 2 format may indicate that AIC was used for the sidelink communication (e.g. AIC is on). In some instances, the new SCI 2 format can include one or more of the AIC parameters (e.g., cancellation frequency subcarriers, power level, etc.).

Figure 7:
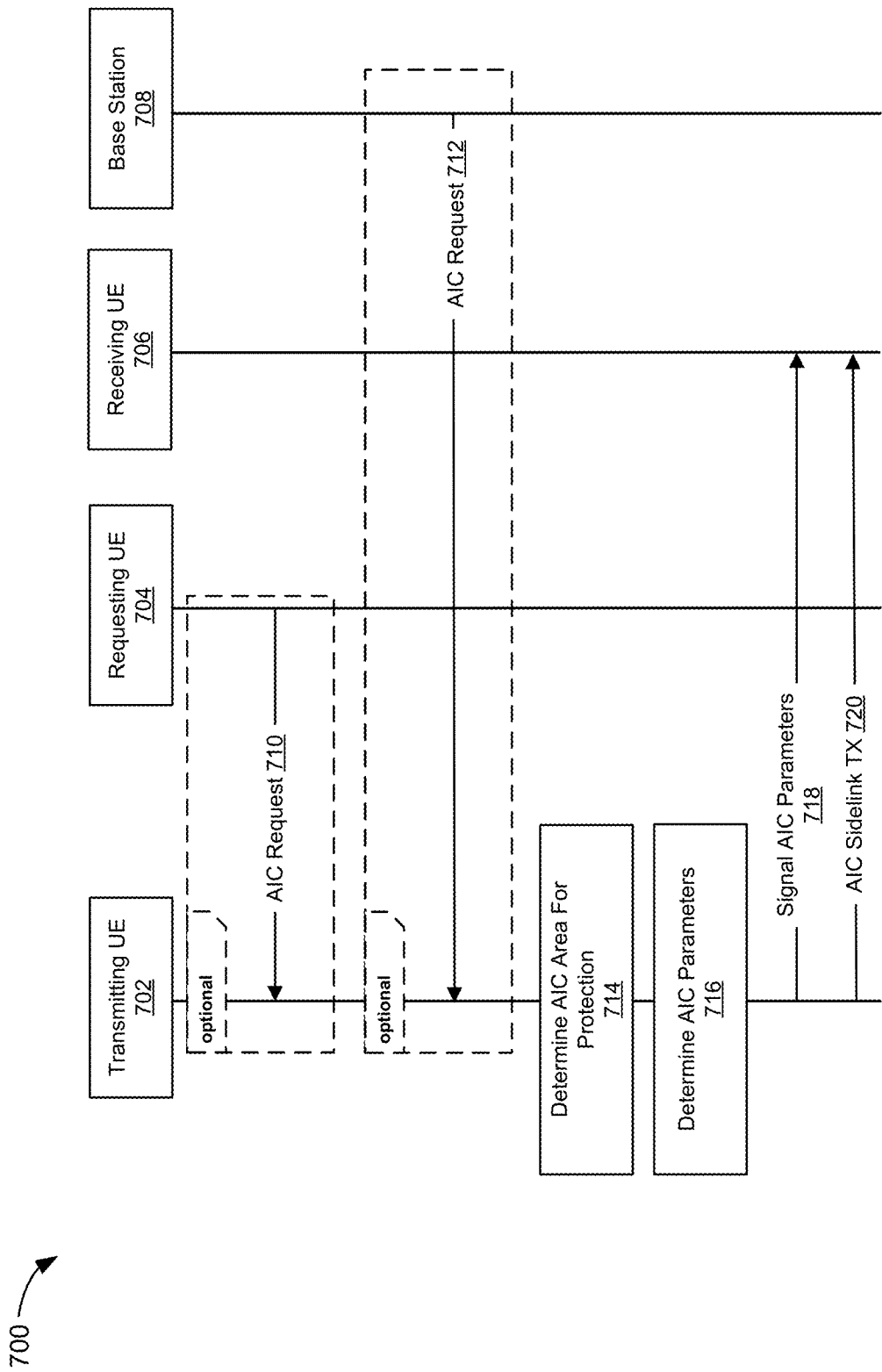
FIG. 7 is a sequence diagram illustrating an example of a sequence for performing active interference cancellation for sidelink communications, in accordance with some examples.

FIG. 7 is a sequence diagram illustrating an example of sequence 700 for performing active interference cancellation (AIC) during sidelink communications. The sequence 700 may be performed by a transmitting (TX) UE 702, a requesting UE 704, a receiving (RX) UE 706 and a base station 708. At action 710, requesting UE 704 may optionally send a request for AIC protection to TX UE 702. In some examples, the request for AIC protection from requesting UE 704 to TX UE 702 may identify one or more frequencies and/or one or more frequency ranges for protection (e.g., optimization areas). In some examples, the request for AIC protection may identify a leakage requirement associated with a frequency or a frequency range.

In some aspects, the request for AIC protection from requesting UE 704 may be signaled using a first stage SCI (e.g., SCI 1), a second stage SCI (e.g., SCI 2), and/or any other suitable signaling method. In some cases, the request for AIC protection may be associated with a reserved retransmission resource or a periodically reserved resource. In some examples, the request for AIC protection may be associated with a sidelink communications having a threshold priority level.

At action 712, base station 708 may optionally send an AIC request to TX UE 702. In some aspects, the AIC request from base station 708 to TX UE 702 can be based on a resource pool (RP) configuration. For example, base station 708 may signal TX UE 702 to implement AIC to protect one or more frequency resources based on the resource pool (RP) configuration. In some examples, base station 708 may signal an AIC request to TX UE 702 using downlink control information (DCI) and/or any other suitable signaling method.

At action 714, TX UE 702 can determine an AIC area for protection. In some aspects, the AIC area for protection can correspond to one or more frequencies and/or one or more frequency ranges that are outside of a frequency allocation corresponding to TX UE 702. In some cases, TX UE 702 can determine the AIC area for protection based on a request received from a requesting UE (e.g., requesting UE 704). In some examples, TX UE 702 can determine the AIC area for protection based on a request received from a base station (e.g., base station 708). In some aspects, TX UE 702 can determine the AIC area for protection based on an AIC configuration. For instance, an AIC configuration may be used to configure TX UE 702 to implement AIC protection for one or more frequencies that are outside the frequency allocation corresponding to TX UE 702.

In some examples, TX UE 702 can determine the AIC area of protection based on sidelink traffic priority levels. For instance, TX UE 702 can implement AIC to protect resource reservations (e.g., based on SCI) that are above a priority level threshold. In some examples, TX UE 702 may perform AIC based on a leakage requirement that is associated with a priority level.

In some aspects, TX UE 702 may determine the AIC area of protection based on a channel busy ratio (CBR) threshold. For example, TX UE 702 may perform AIC with sidelink communications when CBR is greater than or equal to a 25% threshold. In some cases, TX UE 702 may perform AIC for sidelink communications based on a synchronization signal source. In one illustrative example, TX UE 702 may perform sidelink communication without AIC when the synchronization signal is based on GNSS or a base station. In another illustrative example, TX UE 702 may perform AIC for sidelink communications when the synchronization signal is based on another UE or an internal UE clock.

At action 716, TX UE 702 can determine one or more parameters associated with performing AIC during sidelink. In some aspects, the AIC parameters can include a number of frequency subcarriers, the position of the frequency subcarriers, and/or the power level of the frequency subcarriers. In some examples, the AIC parameters can be determined based on the frequency range of the AIC area(s) and/or the leakage requirement associated with the AIC area(s). Examples of AIC patterns are illustrated in FIGS. 6A, 6B, and 6C.

At action 718, TX UE 702 can transmit an indication of the AIC parameters to RX UE 706. In some aspects, the indication of the AIC parameters can include an indication that AIC was performed in connection with a sidelink communication (e.g., AIC is on). In some cases, the indication of the AIC parameters can identify the frequency subcarriers used to perform AIC. In some examples, the indication of the AIC parameters can be signaled using SCI 1, SCI 2, and/or any other suitable signaling method.

At action 720, TX UE 702 can perform AIC for a sidelink transmission to RX UE 706. In some examples, AIC can be used to reduce noise in the AIC areas for protection during a sidelink transmission. In some aspects, RX UE 706 can receive the sidelink transmission and decode the portion associated with the frequency allocation associated with TX UE 702. For example, RX UE 706 can use the indication of the AIC parameters (signaled at action 718) to disregard signals received on one or more of the cancellation frequency subcarriers.

Figure 8:
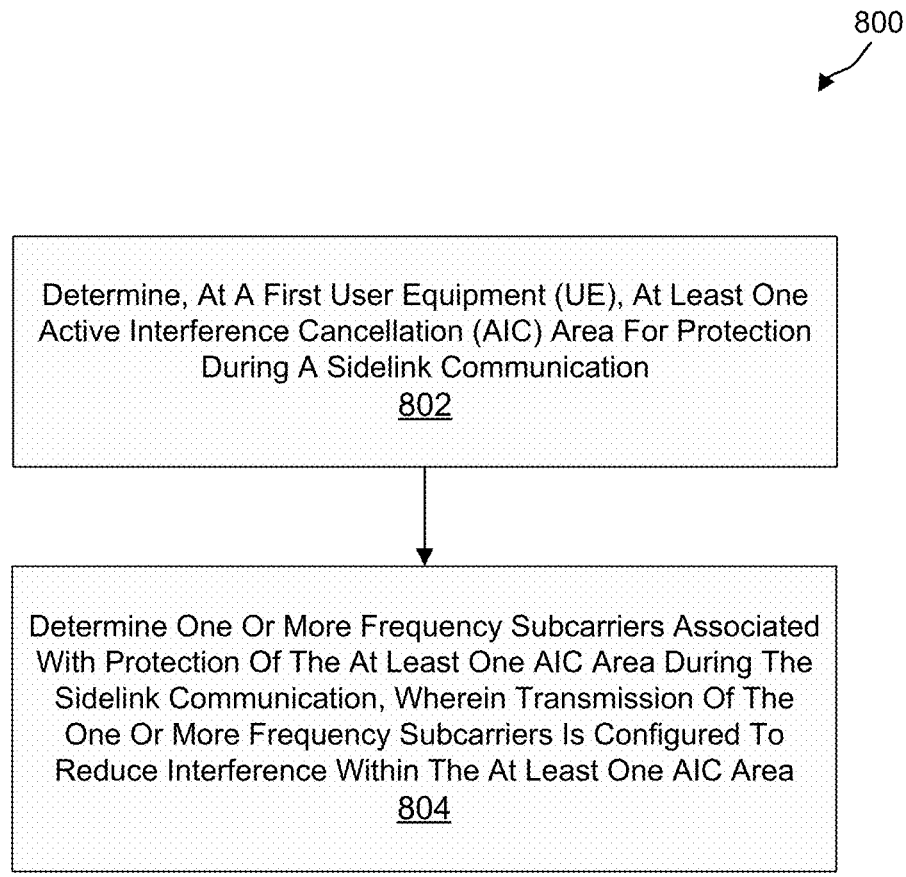
FIG. 8 is a flow diagram illustrating an example of a process for performing active interference cancellation for sidelink communications, in accordance with some examples.

FIG. 8 is a flow diagram illustrating an example of a process 800 for a user equipment (UE) (or a component or device of the UE, such as a chipset, circuit, or other component/device of the UE) to perform active interference cancellation (AIC) during sidelink communications. At block 802, the process 800 includes determining, by a first user equipment (UE), at least one active interference cancellation (AIC) area for protection during a sidelink communication. For example, UE 406 can determine at least one AIC area for protection during a sidelink communication with UE 404.

In some aspects, the process 800 may include obtaining, from a second UE, a request for protecting the at least one AIC area, wherein the request includes at least one of a frequency range associated with the at least one AIC area and a leakage requirement associated with the at least one AIC area. For instance, UE 406 may obtain a request from UE 408 for protecting at least one AIC area. In some cases, the request from UE 408 may include a frequency range associated with AIC area and/or a leakage requirement associated with the AIC area. In some aspects, the request for protecting the at least one AIC area can be received using sidelink control information (SCI). For instance, UE 408 can signal a request for protecting an AIC area to UE 406 using SCI (e.g., SCI 1 and/or SCI 2).

In some cases, the request for protecting the at least one AIC area can include at least one of a reserved retransmission resource and a periodically reserved transmission resource. For instance, the request for AIC protection sent from UE 408 to UE 406 can be associated with a reserved retransmission resource and/or a periodically reserved transmission resource. In some aspects, the at least one AIC area can be associated with a threshold priority level. For example, the request for AIC protection sent from UE 408 to UE 406 can request protection of resources used to transmit sidelink communications having a threshold priority level. In some cases, the threshold priority level can be based on sidelink control information (SCI). For example, UE 406 can determine the at least one AIC area based on a priority level indicated in SCI (e.g., priority levels associated with resource allocations). In some aspects, the process 800 can include determining a leakage requirement for the at least one AIC area based on the threshold priority level. For instance, UE 406 may determine a leakage requirement based on the traffic priority level.

In some examples, determining the at least one AIC area can include identifying the at least one AIC area based on a resource pool configuration. For example, UE 406 can identify the at least one AIC area based on a resource pool configuration. In some cases, determining the at least one AIC area can include receiving an indication of the at least one AIC area from a base station. For instance, base station 402 may transmit an indication of the at least one AIC area to UE 404 and/or UE 406. In some aspects, the at least one AIC area can be based on a default AIC configuration, wherein the default AIC configuration identifies one or more subchannels that are outside of a resource pool associated with the first UE. For example, UE 406 may determine the at least one AIC area based on a default AIC configuration that identifies one or more subchannels that are outside of a frequency allocation associated with UE 406. In some configurations, the at least one AIC area can be determined based on a determination that a channel busy ratio (CBR) exceeds a CBR threshold. For example, UE 406 can determine that a channel busy ratio exceeds a threshold value (e.g., 25%) and can identify the at least one AIC area for protecting the frequencies associated with the channel.

At block 804, the process 800 includes determining one or more frequency subcarriers associated with protection of the at least one AIC area during the sidelink communication, wherein transmission of the one or more frequency subcarriers is configured to reduce interference within the at least one AIC area. For instance, UE 406 can determine one or more frequency subcarriers associated with protection of the at least one AIC area (e.g., requested by UE 408, signaled by base station 402, and/or otherwise determined by UE 406). In some examples, a UE may further comprise a transceiver that is configured to transmit the one or more frequency subcarriers. For example, UE 406 can use a transceiver to transmit one or more frequency subcarriers associated with protection of the at least one AIC area.

In some examples, the process 800 can include determining, by the first UE, a number of the one or more frequency subcarriers, a position of the one or more frequency subcarriers, and a power level associated with the one or more frequency subcarriers. For example, UE 406 can determine AIC parameters that include the number of frequency subcarriers, the position of frequency subcarriers, and/or the power of frequency subcarriers (e.g., cancellation frequency subcarriers 606). In some aspects, the number of the one or more frequency subcarriers can be based on an AIC configuration. In some cases, the number of the one or more frequency subcarriers can be based on at least one of a frequency range associated with the at least one AIC area and a leakage requirement associated with the at least one AIC area. For example, UE 406 can determine the number of frequency subcarriers for implementing AIC based on an AIC configuration, a frequency range associated with the AIC area, and/or a leakage requirement associated with the AIC area.

In some cases, the number of the one or more frequency subcarriers can be less than or equal to a maximum number of frequency subcarriers, and wherein the maximum number of frequency subcarriers corresponds to a portion of transmission resource allocations. For example, the maximum number of frequency subcarriers that UE 406 may utilize for AIC can correspond to a percentage of the total number of resource elements.

In some aspects, the position of the one or more frequency subcarriers can be based on a pre-configured sub-carrier pattern. In some examples, the position of the one or more frequency subcarriers can be based on at least one of a frequency range associated with the at least one AIC area and a leakage requirement associated with the at least one AIC area. For instance, UE 406 can determine the position of the frequency subcarriers used for AIC based on a pre-configured pattern. In another example, UE 406 can determine the position of the frequency subcarriers used for AIC based on the frequency range and/or the leakage requirement associated with the AIC area.

In some examples, the power level associated with the one or more frequency subcarriers can be based on a power of one or more other frequency subcarriers associated with the sidelink communication. In some instances, the power level associated with the one or more frequency subcarriers can be less than or equal to a maximum power threshold. For example, UE 406 can determine the power level for the cancellation frequency subcarriers 606 based on the power level of frequency allocation 602.

In some cases, the process 800 can include sending, by the first UE, an indication of the one or more frequency subcarriers. In some aspects, the indication can include a first stage sidelink control information (SCI) indication and a second stage SCI indication. For example, UE 406 can send an indication of the one or more frequency subcarriers (e.g., used for AIC) to UE 404. In some cases, UE 406 can signal the indication using a first stage sidelink control information (SCI) indication and a second stage SCI indication. In some examples, the first stage SCI indication includes an AIC indication and the second stage SCI indication identifies the one or more frequency subcarriers. In some cases, the first stage SCI indication includes a reference to an AIC format in the second stage SCI indication, wherein the second stage SCI indication identifies the one or more frequency subcarriers.

In some aspects, the process 800 can include determining, by the first UE, a synchronization source associated with a sidelink synchronization signal received by the first UE. In some cases, the synchronization source may correspond to another UE. For example, UE 408 can determine that the source for a sidelink synchronization signal corresponds to UE 406. In some examples, the synchronization source may correspond to GNSS, a base station, another UE, or an internal clock. In some cases, a UE may be configured to perform AIC for sidelink communications when the synchronization source corresponds to another UE or an internal clock.

Figure 9:
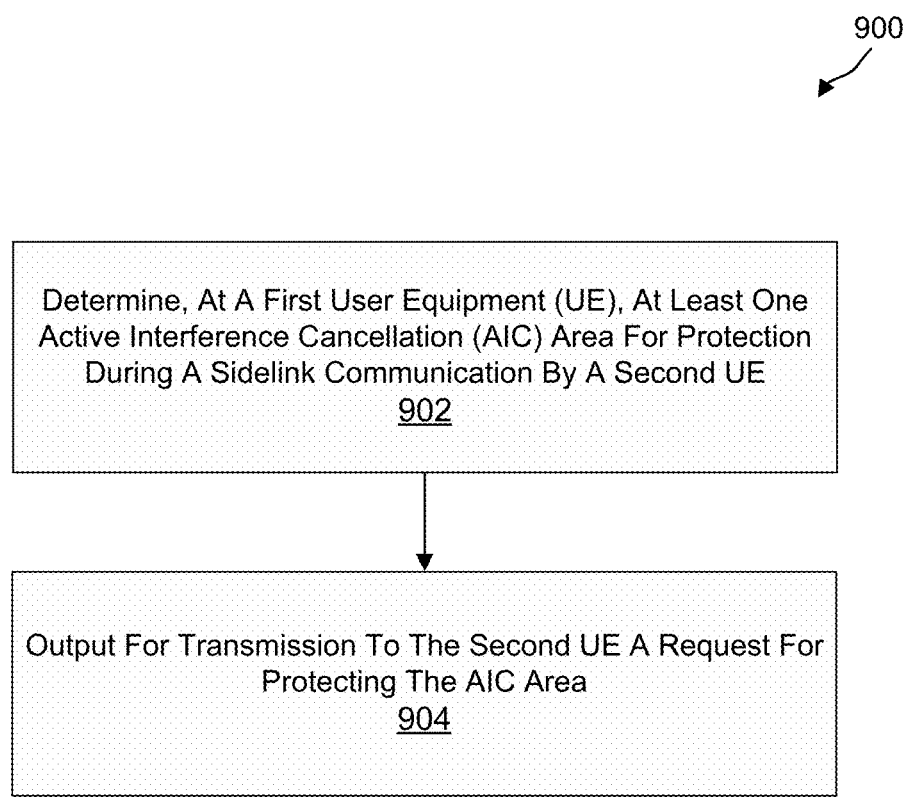
FIG. 9 is a flow diagram illustrating another example of a process for performing active interference cancellation for sidelink communications, in accordance with some examples.

FIG. 9 is a flow diagram illustrating an example of a process 900 for a user equipment (UE) (or a component or device of the UE, such as a chipset, circuit, or other component/device of the UE) to perform active interference cancellation (AIC) during sidelink communications. At block 902, the process 900 includes determining, by a first user equipment (UE), at least one active interference cancellation (AIC) area for protection during a sidelink communication by a second UE. For example, UE 408 may determine an AIC area (e.g., an allocated frequency range) for protection during a sidelink communication by UE 406.

At block 904, the process 900 includes outputting for transmission to the second UE a request for protecting the AIC area. In some aspects, the request for protecting the AIC area can include at least one of a frequency range associated with the at least one AIC area and a leakage requirement associated with the at least one AIC area For example, UE 408 can output a request that may be transmitted to UE 406 for protecting the AIC area that identifies a frequency range for protection and/or a leakage requirement. In some aspects, a UE may further comprise a transceiver that may be configured to transmit the request for protecting the AIC area. In some examples, the request for protecting the at least one AIC are can be included with sidelink control information (SCI).

In some cases, the process 900 can include obtaining an indication of one or more frequency subcarriers corresponding to the at least one AIC area. In some aspects, the indication of the one or more frequency subcarriers is obtained using sidelink control information (SCI). For example, UE 406 can transmit an indication of one or more AIC parameters (e.g., frequency subcarriers, power level, etc.) to UE 408. In some cases, UE 406 can transmit the indication of the one or more frequency subcarriers using SCI.

In some examples, the processes described herein (e.g., process 800, process 900 and/or other process described herein) may be performed by a computing device or apparatus (e.g., a UE or a base station). In one example, the process 800 and/or process 900 can be performed by the base station 102 of FIG. 2, the UE 104 of FIG. 2 and/or the wireless device 1007 of FIG. 10.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces can be configured to communicate and/or receive wired and/or wireless data, including data according to the 3G, 4G, 5G, and/or other cellular standard, data according to the Wi-Fi (802.11x) standards, data according to the Bluetooth™ standard, data according to the Internet Protocol (IP) standard, and/or other types of data.

The components of the computing device can be implemented in circuitry. For example, the components can include and/or can be implemented using electronic circuits or other electronic hardware, which can include one or more programmable electronic circuits (e.g., microprocessors, neural processing units (NPUs), graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes 800 and 900 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, process 800, process 900, and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 10:
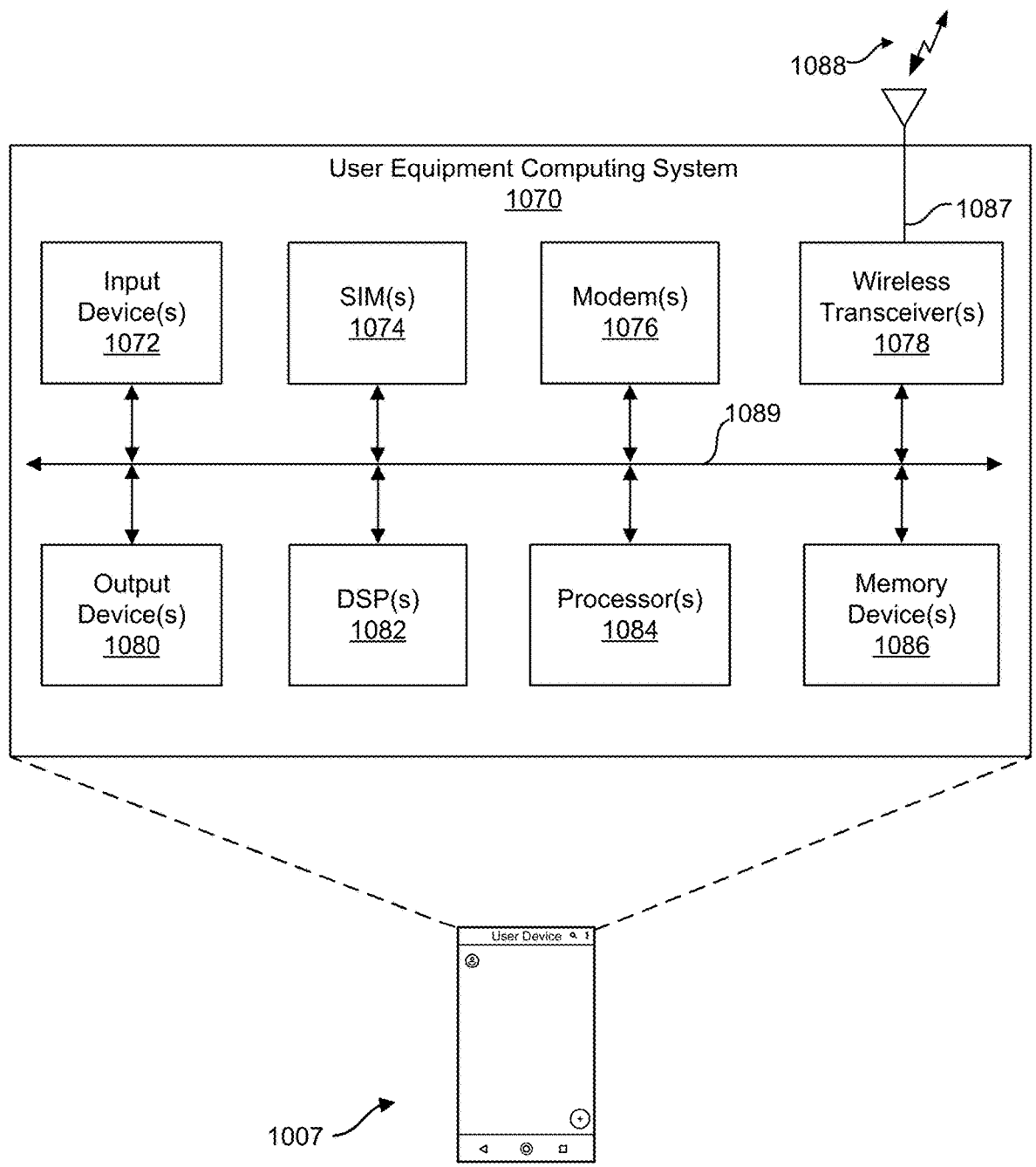
FIG. 10 is a block diagram illustrating components of a user equipment, in accordance with some examples.

FIG. 10 illustrates an example of a computing system 1070 of a wireless device 1007. The wireless device 1007 can include a client device such as a UE (e.g., UE 104, UE 152, UE 190) or other type of device (e.g., a station (STA) configured to communication using a Wi-Fi interface) that can be used by an end-user. Wireless device can also include network devices (e.g., base stations such as eNBs and/or gNBs, Wi-Fi access points (APs) such as routers, range extenders or the like, etc.). For example, the wireless device 1007 can include a mobile phone, router, tablet computer, laptop computer, tracking device, wearable device (e.g., a smart watch, glasses, an extended reality (XR) device such as a virtual reality (VR), augmented reality (AR) or mixed reality (MR) device, etc.), Internet of Things (IoT) device, base station, access point, and/or another device that is configured to communicate over a wireless communications network. The computing system 1070 includes software and hardware components that can be electrically or communicatively coupled via a bus 1089 (or may otherwise be in communication, as appropriate). For example, the computing system 1070 includes one or more processors 1084. The one or more processors 1084 can include one or more CPUs, ASICs, FPGAs, APs, GPUs, VPUs, NSPs, microcontrollers, dedicated hardware, any combination thereof, and/or other processing device or system. The bus 1089 can be used by the one or more processors 1084 to communicate between cores and/or with the one or more memory devices 1086.

The computing system 1070 may also include one or more memory devices 1086, one or more digital signal processors (DSPs) 1082, one or more subscriber identity modules (SIMs) 1074, one or more modems 1076, one or more wireless transceivers 1078, one or more antennas 1087, one or more input devices 1072 (e.g., a camera, a mouse, a keyboard, a touch sensitive screen, a touch pad, a keypad, a microphone, and/or the like), and one or more output devices 1080 (e.g., a display, a speaker, a printer, and/or the like).

In some aspects, computing system 1070 can include one or more radio frequency (RF) interfaces configured to transmit and/or receive RF signals. In some examples, an RF interface can include components such as modem(s) 1076, wireless transceiver(s) 1078, and/or antennas 1087. The one or more wireless transceivers 1078 can transmit and receive wireless signals (e.g., signal 1088) via antenna 1087 from one or more other devices, such as other wireless devices, network devices (e.g., base stations such as eNBs and/or gNBs, Wi-Fi access points (APs) such as routers, range extenders or the like, etc.), cloud networks, and/or the like. In some examples, the computing system 1070 can include multiple antennas or an antenna array that can facilitate simultaneous transmit and receive functionality. Antenna 1087 can be an omnidirectional antenna such that radio frequency (RF) signals can be received from and transmitted in all directions. The wireless signal 1088 may be transmitted via a wireless network. The wireless network may be any wireless network, such as a cellular or telecommunications network (e.g., 3G, 4G, 5G, etc.), wireless local area network (e.g., a Wi-Fi network), a Bluetooth™ network, and/or other network.

In some examples, the wireless signal 1088 may be transmitted directly to other wireless devices using sidelink communications (e.g., using a PC5 interface, using a DSRC interface, etc.). Wireless transceivers 1078 can be configured to transmit RF signals for performing sidelink communications via antenna 1087 in accordance with one or more transmit power parameters that can be associated with one or more regulation modes. Wireless transceivers 1078 can also be configured to receive sidelink communication signals having different signal parameters from other wireless devices.

In some examples, the one or more wireless transceivers 1078 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals 1088 into a baseband or intermediate frequency and can convert the RF signals to the digital domain.

In some cases, the computing system 1070 can include a coding-decoding device (or CODEC) configured to encode and/or decode data transmitted and/or received using the one or more wireless transceivers 1078. In some cases, the computing system 1070 can include an encryption-decryption device or component configured to encrypt and/or decrypt data (e.g., according to the AES and/or DES standard) transmitted and/or received by the one or more wireless transceivers 1078.

The one or more SIMs 1074 can each securely store an international mobile subscriber identity (IMSI) number and related key assigned to the user of the wireless device 1007. The IMSI and key can be used to identify and authenticate the subscriber when accessing a network provided by a network service provider or operator associated with the one or more SIMs 1074. The one or more modems 1076 can modulate one or more signals to encode information for transmission using the one or more wireless transceivers 1078. The one or more modems 1076 can also demodulate signals received by the one or more wireless transceivers 1078 in order to decode the transmitted information. In some examples, the one or more modems 1076 can include a Wi-Fi modem, a 4G (or LTE) modem, a 5G (or NR) modem, and/or other types of modems. The one or more modems 1076 and the one or more wireless transceivers 1078 can be used for communicating data for the one or more SIMs 1074.

The computing system 1070 can also include (and/or be in communication with) one or more non-transitory machine-readable storage media or storage devices (e.g., one or more memory devices 1086), which can include, without limitation, local and/or network accessible storage, a disk drive, a drive array, an optical storage device, a solid-state storage device such as a RAM and/or a ROM, which can be programmable, flash-updateable and/or the like. Such storage devices may be configured to implement any appropriate data storage, including without limitation, various file systems, database structures, and/or the like.

In various embodiments, functions may be stored as one or more computer-program products (e.g., instructions or code) in memory device(s) 1086 and executed by the one or more processor(s) 1084 and/or the one or more DSPs 1082. The computing system 1070 can also include software elements (e.g., located within the one or more memory devices 1086), including, for example, an operating system, device drivers, executable libraries, and/or other code, such as one or more application programs, which may comprise computer programs implementing the functions provided by various embodiments, and/or may be designed to implement methods and/or configure systems, as described herein.

In some aspects, the wireless device 1007 can include means for performing operations described herein. The means can include one or more of the components of the computing system 1070. For example, the means for performing operations described herein may include one or more of input device(s) 1072, SIM(s) 1074, modems(s) 1076, wireless transceiver(s) 1078, output device(s) (1080), DSP(s) 1082, processors (1084), memory device(s) 1086, and/or antenna(s) 1087.

In some aspects, wireless device 1007 can include: means for determining at least one active interference cancellation (AIC) area for protection during a sidelink communication; and means for transmitting one or more frequency subcarriers associated with protection of the at least one AIC area during the sidelink communication, wherein transmission of the one or more frequency subcarriers reduces interference within the at least one AIC area. In some examples, the means for determining can include the one or more processors 1084, the one or more DSPs 1082, the one or more memory devices 1086, any combination thereof, or other component(s) of the wireless device. In some examples, the means for transmitting can include the one or more wireless transceivers 1078, the one or more modems 1076, the one or more SIMs 1074, the one or more processors 1084, the one or more DSPs 1082, the one or more memory devices 1086, any combination thereof, or other component(s) of the wireless device.

In some examples, wireless device 1007 can include: means for determining at least one active interference cancellation (AIC) area for protection during a sidelink communication by a user equipment (UE); and means for transmitting, to the UE, a request for protecting the AIC area. In some examples, the means for determining can include the one or more processors 1084, the one or more DSPs 1082, the one or more memory devices 1086, any combination thereof, or other component(s) of the wireless device. In some examples, the means for transmitting can include the one or more wireless transceivers 1078, the one or more modems 1076, the one or more SIMs 1074, the one or more processors 1084, the one or more DSPs 1082, the one or more memory devices 1086, any combination thereof, or other component(s) of the wireless device.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering duplication, or combination of A, B, and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative aspects of the disclosure include:

Aspect 1: A method for wireless communications performed at a first user equipment (UE), comprising: determining at least one active interference cancellation (AIC) area for protection during a sidelink communication; and determining one or more frequency subcarriers associated with protection of the at least one AIC area during the sidelink communication, wherein transmission of the one or more frequency subcarriers is configured to reduce interference within the at least one AIC area.

Aspect 2: The method of Aspect 1, further comprising: obtaining a request from a second UE for protecting the at least one AIC area, wherein the request includes at least one of a frequency range associated with the at least one AIC area and a leakage requirement associated with the at least one AIC area.

Aspect 3: The method of Aspect 2, wherein the request for protecting the at least one AIC area is obtained using sidelink control information (SCI).

Aspect 4: The method of any of Aspects 2 to 3, wherein the request for protecting the at least one AIC area includes at least one of a reserved retransmission resource and a periodically reserved transmission resource.

Aspect 5: The method of any of Aspects 1 to 4, wherein the at least one AIC area is associated with a threshold priority level.

Aspect 6: The method of Aspect 5, wherein the threshold priority level is based on sidelink control information (SCI).

Aspect 7: The method of any of Aspects 5 to 6, further comprising: determining a leakage requirement for the at least one AIC area based on the threshold priority level.

Aspect 8: The method of any of Aspects 1 to 7, further comprising: determining a synchronization source associated with a sidelink synchronization signal received by the apparatus.

Aspect 9: The method of Aspect 8, wherein the synchronization source corresponds to a user equipment (UE).

Aspect 10: The method of any of Aspects 1 to 9, wherein determining the at least one AIC area further comprises: identifying the at least one AIC area based on a resource pool configuration.

Aspect 11: The method of any of Aspects 1 to 10, wherein determining the at least one AIC area further comprises: obtaining an indication of the at least one AIC area from a base station.

Aspect 12: The method of any of Aspects 1 to 11, wherein the at least one AIC area is based on a default AIC configuration, wherein the default AIC configuration identifies one or more subchannels that are outside of a resource pool associated with the apparatus.

Aspect 13: The method of any of Aspects 1 to 12, wherein the at least one AIC area is determined based on a determination that a channel busy ratio (CBR) exceeds a CBR threshold.

Aspect 14: The method of any of Aspects 1 to 13, further comprising: determining a number of the one or more frequency subcarriers, a position of the one or more frequency subcarriers, and a power level associated with the one or more frequency subcarriers.

Aspect 15: The method of Aspect 14, wherein the number of the one or more frequency subcarriers is based on an AIC configuration.

Aspect 16: The method of any of Aspects 14 to 15, wherein the number of the one or more frequency subcarriers is based on at least one of a frequency range associated with the at least one AIC area and a leakage requirement associated with the at least one AIC area.

Aspect 17: The method of any of Aspects 14 to 16, wherein the number of the one or more frequency subcarriers is less than or equal to a maximum number of frequency subcarriers, and wherein the maximum number of frequency subcarriers corresponds to a portion of transmission resource allocations.

Aspect 18: The method of any of Aspects 14 to 17, wherein the position of the one or more frequency subcarriers is based on a pre-configured sub-carrier pattern.

Aspect 19: The method of any of Aspects 14 to 18, wherein the position of the one or more frequency subcarriers is based on at least one of a frequency range associated with the at least one AIC area and a leakage requirement associated with the at least one AIC area.

Aspect 20: The method of any of Aspects 14 to 19, wherein the power level associated with the one or more frequency subcarriers is based on a power of one or more other frequency subcarriers associated with the sidelink communication.

Aspect 21: The method of any of Aspects 14 to 20, wherein the power level associated with the one or more frequency subcarriers is less than or equal to a maximum power threshold.

Aspect 22: The method of any of Aspects 1 to 21, further comprising: sending an indication of the one or more frequency subcarriers.

Aspect 23: The method of Aspect 22, wherein the indication includes a first stage sidelink control information (SCI) indication and a second stage SCI indication.

Aspect 24: The method of Aspect 23, wherein the first stage SCI indication includes an AIC indication and the second stage SCI indication identifies the one or more frequency subcarriers.

Aspect 25: The method of any of Aspects 23 to 24, wherein the first stage SCI indication includes a reference to an AIC format in the second stage SCI indication, wherein the second stage SCI indication identifies the one or more frequency subcarriers.

Aspect 26: A method for wireless communications performed at a first user equipment (UE), comprising: determining at least one active interference cancellation (AIC) area for protection during a sidelink communication by a second UE; and outputting for transmission to the second UE a request for protecting the AIC area.

Aspect 27: The method of Aspect 26, wherein the request for protecting the AIC area includes at least one of a frequency range associated with the at least one AIC area and a leakage requirement associated with the at least one AIC area.

Aspect 28: The method of any of Aspects 26 to 27, wherein the request for protecting the at least one AIC area is transmitted using sidelink control information (SCI).

Aspect 29: The method of any of Aspects 26 to 28, further comprising: obtaining an indication of one or more frequency subcarriers corresponding to the at least one AIC area.

Aspect 30: The method of Aspect 29, wherein the indication of the one or more frequency subcarriers is received using sidelink control information (SCI).

Aspect 31: An apparatus for wireless communications, comprising: at least one memory; and at least one processor coupled to the at least one memory, wherein the at least one processor is configured to perform operations in accordance with any one of Aspects 1-30.

Aspect 32: A user equipment (UE) apparatus, comprising: at least one transceiver; at least one memory comprising instructions; and at least one processor configured to execute the instructions and cause the UE apparatus to perform operations in accordance with any one of Aspects 1-25, wherein the at least one transceiver is configured to transmit the one or more frequency subcarriers.

Aspect 33: A user equipment (UE) apparatus, comprising: at least one transceiver; at least one memory comprising instructions; and at least one processor configured to execute the instructions and cause the UE apparatus to perform operations in accordance with any one of Aspects 26-30, wherein the at least one transceiver is configured to transmit the request for protecting the AIC area.

Aspect 34: An apparatus for wireless communications, comprising means for performing operations in accordance with any one of Aspects 1 to 30.

Aspect 35: A non-transitory computer-readable medium comprising instructions that, when executed by an apparatus, cause the apparatus to perform operations in accordance with any one of Aspects 1 to 30.

What is claimed is:

1. A first user equipment (UE) for wireless communications, comprising:
    at least one memory comprising instructions; and
    at least one processor configured to execute the instructions and cause the first UE to:
        obtain a request from a second UE for protecting at least one active interference cancellation (AIC) area, wherein the request includes a frequency range associated with the at least one AIC area;
        determine, based on the request from the second UE, the at least one AIC area for protection during a sidelink communication with at least one of the second UE or a third UE; and
        determine one or more frequency subcarriers associated with protection of the at least one AIC area during the sidelink communication, wherein transmission of the one or more frequency subcarriers is configured to reduce interference within the at least one AIC area.

2. The first UE of claim 1, wherein the request further includes a leakage requirement associated with the at least one AIC area.

3. The first UE of claim 1, wherein the request for protecting the at least one AIC area is obtained using sidelink control information (SCI).

4. The first UE of claim 1, wherein the request for protecting the at least one AIC area includes at least one of a reserved retransmission resource or a periodically reserved transmission resource.

5. The first UE of claim 1, wherein the at least one AIC area is associated with a threshold priority level.

6. The first UE of claim 5, wherein the threshold priority level is based on sidelink control information (SCI).

7. The first UE of claim 5, wherein the at least one processor is further configured to cause the first UE to:
    determine a leakage requirement for the at least one AIC area based on the threshold priority level.

8. The first UE of claim 1, wherein the at least one processor is further configured to cause the first UE to:
    determine a synchronization source associated with a sidelink synchronization signal received by the first UE.

9. The first UE of claim 8, wherein the synchronization source corresponds to a user equipment (UE).

10. The first UE of claim 1, wherein, to determine the at least one AIC area, the at least one processor is further configured to cause the first UE to:
    identify the at least one AIC area based on a resource pool configuration.

11. The first UE of claim 1, wherein, to determine the at least one AIC area, the at least one processor is further configured to cause the first UE to:
    obtain an indication of the at least one AIC area from a base station.

12. The first UE of claim 1, wherein the at least one processor is configured to determine at least one other AIC area based on a default AIC configuration, and wherein the default AIC configuration identifies one or more subchannels that are outside of a resource pool associated with the first UE.

13. The first UE of claim 1, wherein the at least one processor is configured to determine the at least one AIC area is based on a determination that a channel busy ratio (CBR) exceeds a CBR threshold.

14. The first UE of claim 1, wherein the at least one processor is further configured to cause the first UE to:
determine a number of the one or more frequency subcarriers, a position of the one or more frequency subcarriers, and a power level associated with the one or more frequency subcarriers.

15. The first UE of claim 14, wherein the number of the one or more frequency subcarriers is based on an AIC configuration.

16. The first UE of claim 14, wherein the number of the one or more frequency subcarriers is based on at least one of a frequency range associated with the at least one AIC area or a leakage requirement associated with the at least one AIC area.

17. The first UE of claim 14, wherein the number of the one or more frequency subcarriers is less than or equal to a maximum number of frequency subcarriers, and wherein the maximum number of frequency subcarriers corresponds to a portion of transmission resource allocations.

18. The first UE of claim 14, wherein the position of the one or more frequency subcarriers is based on a pre-configured sub-carrier pattern.

19. The first UE of claim 14, wherein the position of the one or more frequency subcarriers is based on at least one of the frequency range associated with the at least one AIC area or a leakage requirement associated with the at least one AIC area.

20. The first UE of claim 14, wherein the power level associated with the one or more frequency subcarriers is based on a power of one or more other frequency subcarriers associated with the sidelink communication.

21. The first UE of claim 14, wherein the power level associated with the one or more frequency subcarriers is less than or equal to a maximum power threshold.

22. The first UE of claim 1, wherein the at least one processor is further configured to cause the first UE to:
send an indication of the one or more frequency subcarriers.

23. The first UE of claim 22, wherein the indication includes a first stage sidelink control information (SCI) indication and a second stage SCI indication.

24. The first UE of claim 23, wherein the first stage SCI indication includes an AIC indication and the second stage SCI indication identifies the one or more frequency subcarriers.

25. The first UE of claim 23, wherein the first stage SCI indication includes a reference to an AIC format in the second stage SCI indication, wherein the second stage SCI indication identifies the one or more frequency subcarriers.

26. The first UE of claim 1, further comprising a transceiver configured to transmit the one or more frequency subcarriers, wherein the first UE is configured as a user equipment (UE).

27. A method for wireless communications performed at a first user equipment (UE), comprising:
obtaining a request from a second UE for protecting at least one active interference cancellation (AIC) area, wherein the request includes a frequency range associated with the at least one AIC area;
determining, based on the request from the second UE, the at least one AIC area for protection during a sidelink communication with at least one of the second UE or a third UE; and
determining one or more frequency subcarriers associated with protection of the at least one AIC area during the sidelink communication, wherein transmission of the one or more frequency subcarriers is configured to reduce interference within the at least one AIC area.

28. The method of claim 27,
wherein the request further includes a leakage requirement associated with the at least one AIC area.

29. An apparatus for wireless communications, comprising:
at least one memory comprising instructions; and
at least one processor configured to execute the instructions and cause the apparatus to:
determine at least one active interference cancellation (AIC) area for protection during a sidelink communication by a user equipment (UE); and
output, for transmission to the UE, a request for protecting the AIC area, wherein the request includes a frequency range associated with the at least one AIC area.

30. A method for wireless communications performed at a first user equipment (UE), comprising:
determining at least one active interference cancellation (AIC) area for protection during a sidelink communication by a second UE; and
outputting, for transmission to the second UE, a request for protecting the AIC area, wherein the request includes a frequency range associated with the at least one AIC area.

* * * * *